US012659921B2

(12) United States Patent
Han et al.

(10) Patent No.: US 12,659,921 B2
(45) Date of Patent: Jun. 16, 2026

(54) NETWORK TRANSFERRING METHOD, TERMINAL, AND NETWORK-SIDE DEVICE

(71) Applicant: VIVO MOBILE COMMUNICATION CO., LTD., Guangdong (CN)

(72) Inventors: Lufeng Han, Guangdong (CN); Yanchao Kang, Guangdong (CN); Pengfei Zhang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 664 days.

(21) Appl. No.: 18/107,279

(22) Filed: Feb. 8, 2023

(65) Prior Publication Data

US 2023/0189202 A1 Jun. 15, 2023

Related U.S. Application Data

(63) Continuation of application No. PCT/CN2021/111505, filed on Aug. 9, 2021.

(30) Foreign Application Priority Data

Aug. 10, 2020 (CN) .......................... 202010797349.8

(51) Int. Cl.
*H04W 36/36* (2009.01)
*H04W 8/02* (2009.01)
*H04W 64/00* (2009.01)
*H04W 36/14* (2009.01)
*H04W 84/04* (2009.01)

(52) U.S. Cl.
CPC ........... *H04W 64/006* (2013.01); *H04W 8/02* (2013.01); *H04W 36/142* (2023.05); *H04W 84/042* (2013.01)

(58) Field of Classification Search
CPC .... H04W 36/142; H04W 36/36; H04W 76/34
See application file for complete search history.

(56) References Cited

U.S. PATENT DOCUMENTS

2006/0209675 A1* 9/2006 Jacobson .............. H04W 48/08
370/216
2010/0296421 A1 11/2010 Watfa et al.
(Continued)

FOREIGN PATENT DOCUMENTS

CN 101102157 A 1/2008
CN 101940033 A 1/2011
(Continued)

OTHER PUBLICATIONS

First Office Action for Chinese Application No. 202010797349.8, dated Oct. 26, 2022, 9 Pages.
(Continued)

*Primary Examiner* — Barry W Taylor
(74) *Attorney, Agent, or Firm* — Foley & Lardner LLP

(57) ABSTRACT

A network transferring method, a terminal, and a network-side device. The method includes: obtaining, by a terminal, a currently ongoing service on the terminal; releasing, by the terminal, the currently ongoing service on the terminal in a case that a target service is not present in the currently ongoing service on the terminal; and performing, by the terminal, network transferring of the terminal after releasing the currently ongoing service on the terminal.

18 Claims, 9 Drawing Sheets

(56) References Cited

U.S. PATENT DOCUMENTS

| | | | |
|---|---|---|---|
| 2010/0322216 A1 | 12/2010 | Roger et al. | |
| 2015/0065125 A1 | 3/2015 | Patel et al. | |
| 2015/0215769 A1 | 7/2015 | Schwalb | |
| 2019/0268752 A1 | 8/2019 | Buckley et al. | |
| 2019/0357129 A1 | 11/2019 | Park et al. | |
| 2020/0177333 A1 | 6/2020 | Liu | |
| 2021/0014929 A1 | 1/2021 | Jing et al. | |
| 2021/0185508 A1* | 6/2021 | Buckley | H04W 12/06 |
| 2022/0095212 A1* | 3/2022 | Takeda | H04W 48/18 |
| 2022/0095213 A1 | 3/2022 | Ishikawa et al. | |
| 2022/0312182 A1* | 9/2022 | Venkataraman | H04W 48/16 |
| 2022/0394456 A1* | 12/2022 | Liu | H04W 8/06 |

FOREIGN PATENT DOCUMENTS

| | | |
|---|---|---|
| CN | 109089261 A | 12/2018 |
| CN | 110324840 A | 10/2019 |
| CN | 110602744 A | 12/2019 |
| CN | 110650529 A | 1/2020 |
| EP | 3681204 A1 | 1/2019 |
| EP | 3761710 A1 | 1/2021 |
| JP | 2017069974 A | 4/2017 |
| WO | 2020145299 A1 | 7/2007 |
| WO | 2019217806 A1 | 11/2019 |

OTHER PUBLICATIONS

NTT Docomo, "Enhancement to SOR in connected mode" 3GPP TSG CT WG1 Meeting #114, Bratislava, Slovakia, Jan. 2019, C1-191229, 11 Pages.

International Search Report and Written Opinion for Application No. PCT/CN2021/111505, dated Nov. 19, 2021, 8 Pages.

The Extended European Search Report for Application No. 21855480.6, dated Dec. 14, 2023, 15 Pages.

3GPP "3rd Generation Partnership Project; Technical Specification Group Services and System Aspects; Study on Architecture for Next Generation System (Release 14)" 3GPP TR 23.799 V1.2.1, 2016, 526 Pages.

First Office Action for Japanese Application No. 2023-509448, dated Jan. 9, 2024, 7 Pages.

Orange "SoR in HPLMN after registration" 3GPP TSG-CT WG1 Meeting #123-e, Electronic meeting, Apr. 2020, C1-202068, 11 Pages.

CN Office Action on JP 202310349318X dtd Sep. 9, 2025.

* cited by examiner

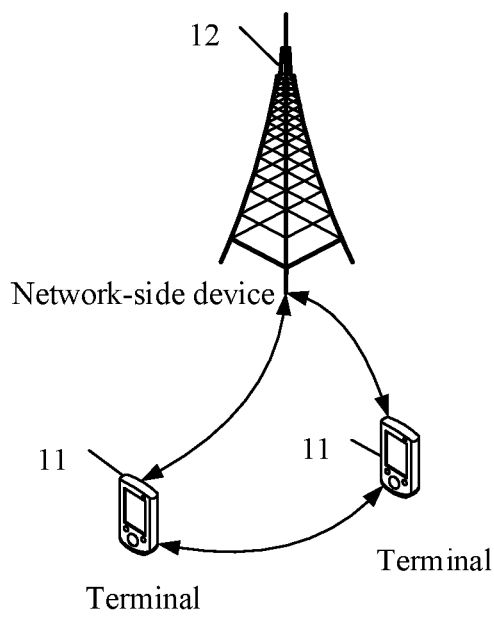

Network-side device

11

11

Terminal

Terminal

FIG. 1

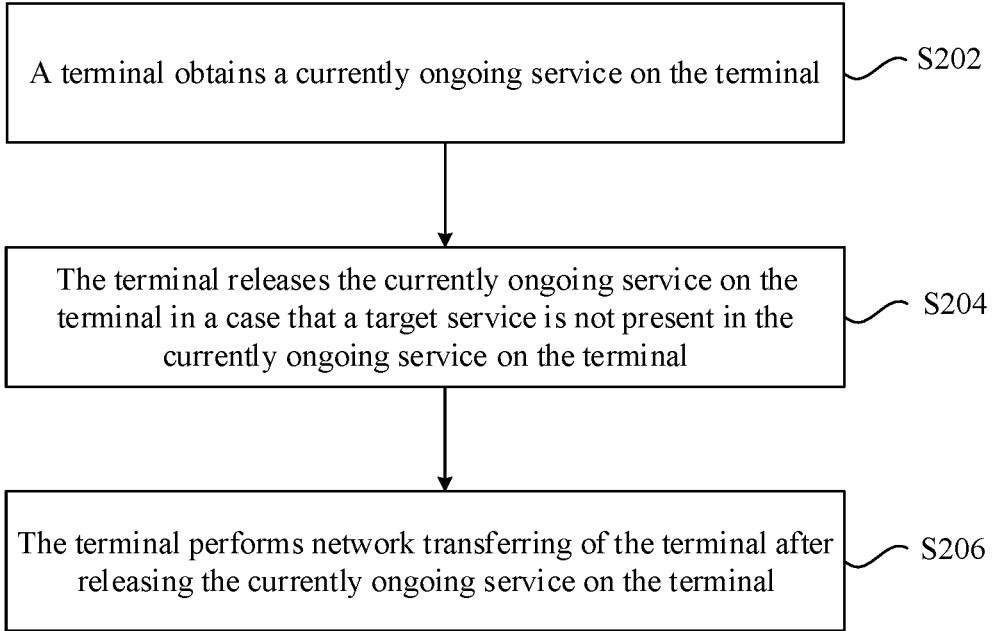

| A terminal obtains a currently ongoing service on the terminal | S202 |

| The terminal releases the currently ongoing service on the terminal in a case that a target service is not present in the currently ongoing service on the terminal | S204 |

| The terminal performs network transferring of the terminal after releasing the currently ongoing service on the terminal | S206 |

FIG. 2

NETWORK TRANSFERRING METHOD, TERMINAL, AND NETWORK-SIDE DEVICE

CROSS-REFERENCE TO RELATED APPLICATIONS

This application is a continuation of International Application No. PCT/CN2021/111505 filed on Aug. 9, 2021, which claims priority to Chinese Patent Application No. 202010797349.8, filed on Aug. 10, 2020, which are incorporated herein by reference in their entireties.

TECHNICAL FIELD

This application relates to the field of communications technologies, and specifically relates to a network transferring method, a terminal, and a network-side device.

BACKGROUND

In the prior art, if user equipment (UE) has some continuous unimportant services, such as a service with a low service priority, the UE camps on the current network. In this case, the services on the UE are not transferred to a target network as expected by the network, resulting in a failure to adjust network operations in a timely manner and a waste of communication resources.

SUMMARY

According to a first aspect, a network transferring method is provided, including: obtaining, by a terminal, a currently ongoing service on the terminal; releasing, by the terminal, the currently ongoing service on the terminal in a case that a target service is not present in the currently ongoing service on the terminal; and performing, by the terminal, network transferring of the terminal after releasing the currently ongoing service on the terminal.

According to a second aspect, a network transferring apparatus is provided, including: an obtaining module, configured to obtain a currently ongoing service on a terminal; a releasing module, configured to release the currently ongoing service on the terminal in a case that a target service is not present in the currently ongoing service on the terminal; and an execution module, configured to perform network transferring of the terminal after the currently ongoing service on the terminal is released.

According to a third aspect, a network transferring method is provided, including: generating, by a network-side device, first information corresponding to extended steering of roaming (EXT-SOR); and sending, by the network-side device, the first information to a terminal, where the first information is used to indicate that a service with target information is a target service.

According to a fourth aspect, a network transferring apparatus is provided, including: a generation module, configured to generate first information corresponding to EXT-SOR; and a second sending module, configured to send the first information to a terminal, where the first information is used to indicate that a service with target information is a target service.

According to a fifth aspect, a terminal is provided, where the terminal includes a processor, a memory, and a program or instructions stored in the memory and capable of running on the processor, and when the program or instructions are executed by the processor, the steps of the method according to the first aspect are implemented.

According to a sixth aspect, a network-side device is provided, where the network-side device includes a processor, a memory, and a program or instructions stored in the memory and capable of running on the processor, and when the program or instructions are executed by the processor, the steps of the method according to the third aspect are implemented.

According to a seventh aspect, a readable storage medium is provided, where a program or instructions are stored in the readable storage medium, and when the program or the instructions are executed by a processor, the steps of the method according to the first aspect are implemented, or the steps of the method according to the third aspect are implemented.

According to an eighth aspect, a chip is provided, where the chip includes a processor and a communications interface, the communications interface is coupled to the processor, and the processor is configured to run a program or instructions of a network-side device to implement the method according to the first aspect or the method according to the third aspect.

BRIEF DESCRIPTION OF DRAWINGS

FIG. 1 is a block diagram of a wireless communications system to which embodiments of this application are applicable;

FIG. 2 is a first flowchart of a network transferring method according to an embodiment of this application;

DETAILED DESCRIPTION

Figure 3:
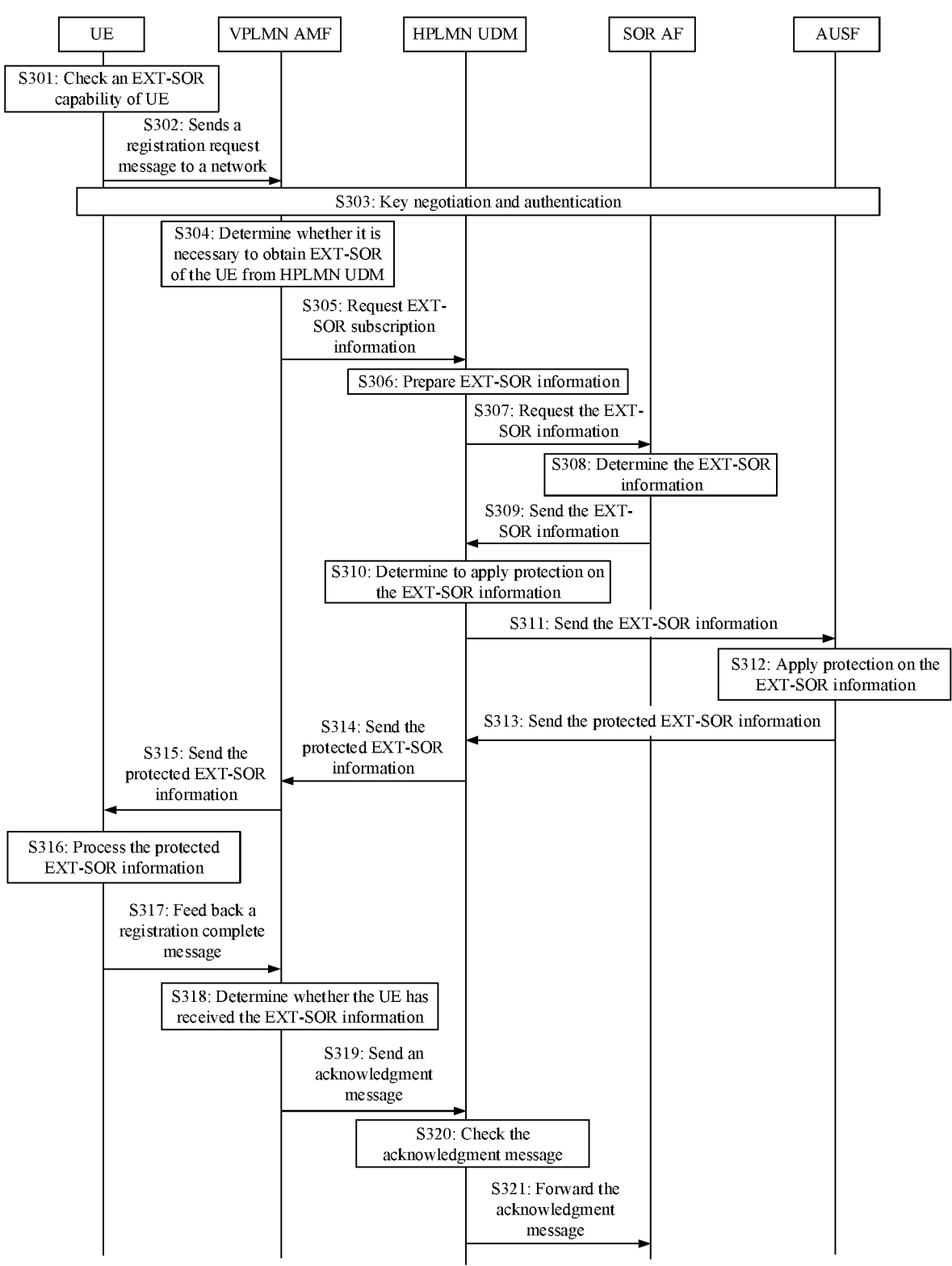
FIG. 3 is a flowchart of a procedure for providing the SOR-CMCI for steering of UE in VPLMN during registration according to an embodiment of this application.

The following clearly describes the technical solutions in embodiments of this application with reference to the accompanying drawings in the embodiments of this application. Apparently, the described embodiments are only some rather than all of the embodiments of this application. All other embodiments obtained by a person of ordinary skill in the art based on the embodiments of this application without creative efforts shall fall within the protection scope of this application.

In the specification and claims of this application, the terms such as "first" and "second" are intended to distinguish between similar objects but do not necessarily indicate a specific order or sequence. It should be understood that the data used in this way is interchangeable in appropriate circumstances so that the embodiments of this application can be implemented in other orders than the order illustrated or described herein, and "first" and "second" are usually for distinguishing same-type objects but not limiting the number of objects, for example, a first object may be one or multiple. In addition, in the specification and claims, "and/or" represents presence of at least one of connected objects, and the symbol "/" in this specification usually indicates an "or" relationship between associated objects.

It should be noted that technologies described in the embodiments of this application are not limited to a long term evolution (LTE)/LTE-advanced (LTE-A) system, and may also be used in various wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are usually used interchangeably. Techniques described herein may be used in the afore-mentioned systems and radio technologies, and may also be used in other systems and radio technologies. However, in the following descriptions, a new radio (NR) system is described for an illustration purpose, and NR terms are used in most of the following descriptions, although these technologies may also be applied to other applications than an NR system application, for example, the 6th generation ($6^{th}$ Generation, 6G) communications system.

FIG. 1 is a block diagram of a wireless communications system to which embodiments of this application are applicable. The wireless communications system includes a terminal 11 and a network-side device 12. The terminal 11 may also be referred to as a terminal device or user equipment (UE), and the terminal 11 may be a terminal-side device, such as a mobile phone, a tablet computer, a laptop computer or a notebook computer, a personal digital assistant (PDA), a palmtop computer, a netbook, an ultra-mobile personal computer (UMPC), a mobile Internet device (MID), a wearable device or vehicle user equipment (VUE), or pedestrian user equipment (PUE). The wearable device includes: a wrist band, earphones, glasses, or the like. It should be noted that a specific type of the terminal 11 is not limited in the embodiments of this application. The network-side device 12 may be a base station or a core network. The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmission and reception point (Transmitting Receiving Point, TRP), or another appropriate term in the art. Provided that a same technical effect is achieved, the base station is not limited to a specific technical term. It should be noted that in the embodiments of this application, the base station in the NR system is merely used as an example, and a specific type of the base station is not limited.

The following describes in detail a network transferring method provided in the embodiments of this application by using specific embodiments and application scenarios thereof with reference to the accompanying drawings.

An embodiment of this application provides a network transferring method. FIG. 2 is a first flowchart of a network transferring method according to an embodiment of this application. As shown in FIG. 2, the method includes the following steps.

Step S202: A terminal obtains a currently ongoing service on the terminal.

Step S204: The terminal releases the currently ongoing service on the terminal in a case that a target service is not present in the currently ongoing service on the terminal.

Step S206: The terminal performs network transferring of the terminal after releasing the currently ongoing service on the terminal.

Through step S202 to step S206 in this embodiment of this application, the terminal can release the currently ongoing service on the terminal in a case that the target service is not present in the currently ongoing service on the terminal, so as to implement network transferring. If the target service is a high-priority service, the terminal may release the currently ongoing service on the terminal and perform network transferring in a case that the high-priority service is not present in the currently ongoing service on the terminal. In addition, the target service may be one or more services specified by the terminal. That is, the terminal may release the currently ongoing service on the terminal and perform network transferring in a case that the specified one or more services are not present in the currently ongoing service on the terminal. This resolves the prior-art problem that a terminal remains camping on a current network and cannot implement network transferring in a case that there is an unimportant service currently on the terminal.

In a specific application scenario of this embodiment of this application, the target service in this embodiment of this application is exemplarily a service whose service priority is higher than a preset priority.

Optionally, in this embodiment of this application, a method for determining, by the terminal, whether the target service is present in the currently ongoing service on the terminal may include the following two manners:

Manner (1): Determining is made based on first information sent by a network-side device and corresponding to EXT-SOR, and specific steps are as follows:

Step S11: The terminal receives first information corresponding to extended steering of roaming EXT-SOR and sent by a network-side device.

Step S12: The terminal determines, based on the first information, whether the target service is present in the currently ongoing service on the terminal, where the first information is used to indicate that a service with target information is the target service.

Manner (2): The terminal autonomously determines whether the target service is present in the currently ongoing service on the terminal.

In other words, in this embodiment of this application, for the manner of determining whether the target service is present in the currently ongoing service on the terminal, the terminal may autonomously determine whether the target service is present in the currently ongoing service on the terminal, or the terminal may determine this based on the information sent by the network-side device.

For manner (1), in an optional implementation of this embodiment of this application, target information in the first information includes at least one of the following: type of the target service, name of the target service, number of the target service, target single network slice selection assistance information (S-NSSAI), target data network name (DNN), target 5G quality of service identifier (5QI), request type of a target PDU session, target Internet protocol (IP) address, and target group filter.

In other words, a service that belongs to a protocol data unit (PDU) session of the target S-NSSAI is a high-priority service, a service connected to a target data network (DNN/APN) is a high-priority service, a service that belongs to the target 5QI is a high-priority service, and a service that is established by using request type information of the target PDU session is a high-priority service, such as an "initial emergency request", an "existing emergency PDU session", and an "MA PDU request". A PDU session whose IP address belongs to the target IP address is a high-priority service, a service of UE with a target communication IP address belonging to an address range is a high-priority service, and a service on a PDU session/QOS flow that contains a target packet filter is a high-priority service.

In addition, for manner (1), it should be noted that the terminal receives the first information sent by the network-side device and carried in at least one of the following: an SOR transparent container and an EXT-SOR transparent container. The SOR transparent container or EXT-SOR transparent container includes at least one of the following: EXT-SOR information 1, EXT-SOR information 2, and EXT-SOR security information.

As shown in Table 1, an IE with an IEI of 73 is an SOR transparent container.

It should be noted that the SOR transparent container is a type 6 information element with a minimum length of 20 octets, and as shown in Table 2 and Table 3, it includes EXT-SOR information 1 and EXT-SOR information 2.

TABLE 2

| 8 7 6 5 4 3 2 1 | |
| --- | --- |
| SOR transparent container IEI | octet 1 |
| Length of SOR transparent container contents | octet 2 |
| | octet 3 |
| SOR header-new | octet 4 |
| SOR-MAC-I$_{AUSF}$-new | octet 5-20 |
| Counter$_{SOR}$-new | octet 21-22 |
| Secured packet | octet 23*-n* |
| EXT-SOR information 1 | |

TABLE 3

| 8 7 6 5 4 3 2 1 | |
| --- | --- |
| SOR transparent container IEI | octet 1 |
| Length of SOR transparent container contents | octet 2 |
| | octet 3 |

TABLE 1

| IEI | Information Element | Type/Reference | Presence | Format | Length |
| --- | --- | --- | --- | --- | --- |
| | Extended protocol discriminator | Extended protocol discriminator 9.2 | M | V | 1 |
| | Security header type | Security header type 9.3 | M | V | 1/2 |
| | Spare half octet | Spare half octet 9.5 | M | V | 1/2 |
| | Registration accept message identity | Message type 9.7 | M | V | 1 |
| | 5GS registration result | 5GS registration result 9.11.3.6 | M | LV | 2 |
| 77 | 5G-GUTI | 5GS mobile identity 9.11.3.4 | O | TLV-E | 14 |
| 4A | Equivalent PLMNs | PLMN list 9.11.3.45 | O | TLV | 5-47 |
| 54 | TAI list | 5GS tracking area identity list 9.11.3.9 | O | TLV | 9-114 |
| 15 | Allowed NSSAI | NSSAI 9.11.3.37 | O | TLV | 4-74 |
| 11 | Rejected NSSAI | Rejected NSSAI 9.11.3.46 | O | TLV | 4-42 |
| 31 | Configured NSSAI | NSSAI 9.11.3.37 | O | TLV | 4-146 |
| 21 | 5GS network feature support | 5GS network feature support 9.11.3.5 | O | TLV | 3-5 |
| 50 | PDU session status | PDU session status 9.11.3.44 | O | TLV | 4-34 |
| 26 | PDU session reactivation result | PDU session reactivation result 9.11.3.42 | O | TLV | 4-34 |
| 72 | PDU session reactivation result error cause | PDU session reactivation result error cause 9.11.3.43 | O | TLV-E | 5-515 |
| 79 | LADN information | LADN information 9.11.3.30 | O | TLV-E | 12-1715 |
| B- | MICO indication | MICO indication 9.11.3.31 | O | TV | 1 |
| 9- | Network slicing indication | Network slicing indication 9.11.3.36 | O | TV | 1 |
| 27 | Service area list | Service area list 9.11.3.49 | O | TLV | 6-114 |
| 5E | T3512 value | GPRS timer 3 9.11.2.5 | O | TLV | 3 |
| 5D | Non-3GPP de-registration timer value | GPRS timer 2 9.11.2.4 | O | TLV | 3 |
| 16 | T3502 value | GPRS timer 2 9.11.2.4 | O | TLV | 3 |
| 34 | Emergency number list | Emergency number list 9.11.3.23 | O | TLV | 5-50 |
| 7A | Extended emergency number list | Extended emergency number list 9.11.3.26 | O | TLV-E | 7-65538 |
| 73 | SOR transparent container | SOR transparent container 9.11.3.51 | O | TLV-E | 20-n |
| 78 | EAP message | EAP message 9.11.2.2 | O | TLV-E | 7-1503 |
| A- | NSSAI inclusion mode | NSSAI inclusion mode 9.11.3.37A | O | TV | 1 |
| 76 | Operator-defined access category definitions | Operator-defined access category definitions 9.11.3.38 | O | TLV-E | 3-n |
| 51 | Negotiated DRX parameters | 5GS DRX parameters 9.11.3.2A | O | TLV | 3 |
| D- | Non-3GPP NW policies | Non-3GPP NW provided policies 9.11.3.36A | O | TV | 1 |
| 60 | EPS bearer context status | EPS bearer context status 9.11.3.23A | O | TLV | 4 |
| 6E | Negotiated extended DRX parameters | Extended DRX parameters 9.11.3.26A | O | TLV | 3 |
| 6C | T3447 value | GPRS timer 3 9.11.2.5 | O | TLV | 3 |
| 6B | T3448 value | GPRS timer 3 9.11.2.4 | O | TLV | 3 |
| 6A | T3324 value | GPRS timer 3 9.11.2.5 | O | TLV | 3 |
| 67 | UE radio capability ID | UE radio capability ID 9.11.3.68 | O | TLV | 3-n |
| 68 | UE radio capability ID deletion indication | UE radio capability ID deletion indication 9.11.3.69 | O | TV | 1 |
| 39 | Pending NSSAI | NSSAI 9.11.3.37 | O | TLV | 4-146 |
| 74 | Ciphering key data | Ciphering key data 9.11.3.18C | O | TLV-E | 34-n |
| 75 | CAG information list | CAG information list 9.11.3.18A | O | TLV-E | 3-n |
| 1B | Truncated 5G-S-TMSI configuration | Truncated 5G-S-TMSI configuration 9.11.3.70 | O | TLV | 3 |
| 1C | Negotiated WUS assistance information | WUS assistance information 9.11.3.71 | O | TLV | 3-n |
| 29 | Negotiated NB-N1 mode DRX parameters | NB-N1 mode DRX parameters 9.11.3.73 | O | TLV | 3 |

TABLE 3-continued

| 8 7 6 5 4 3 2 1 | |
| --- | --- |
| SOR header-new | octet 4 |
| SOR-MAC-I$_{AUSF}$-new | octet 5-20 |
| Counter$_{SOR}$-new | octet 21-22 |
| PLMN ID and access technology list | octet 23*-102* |
| EXT-SOR information 2 | |

Figure 4:
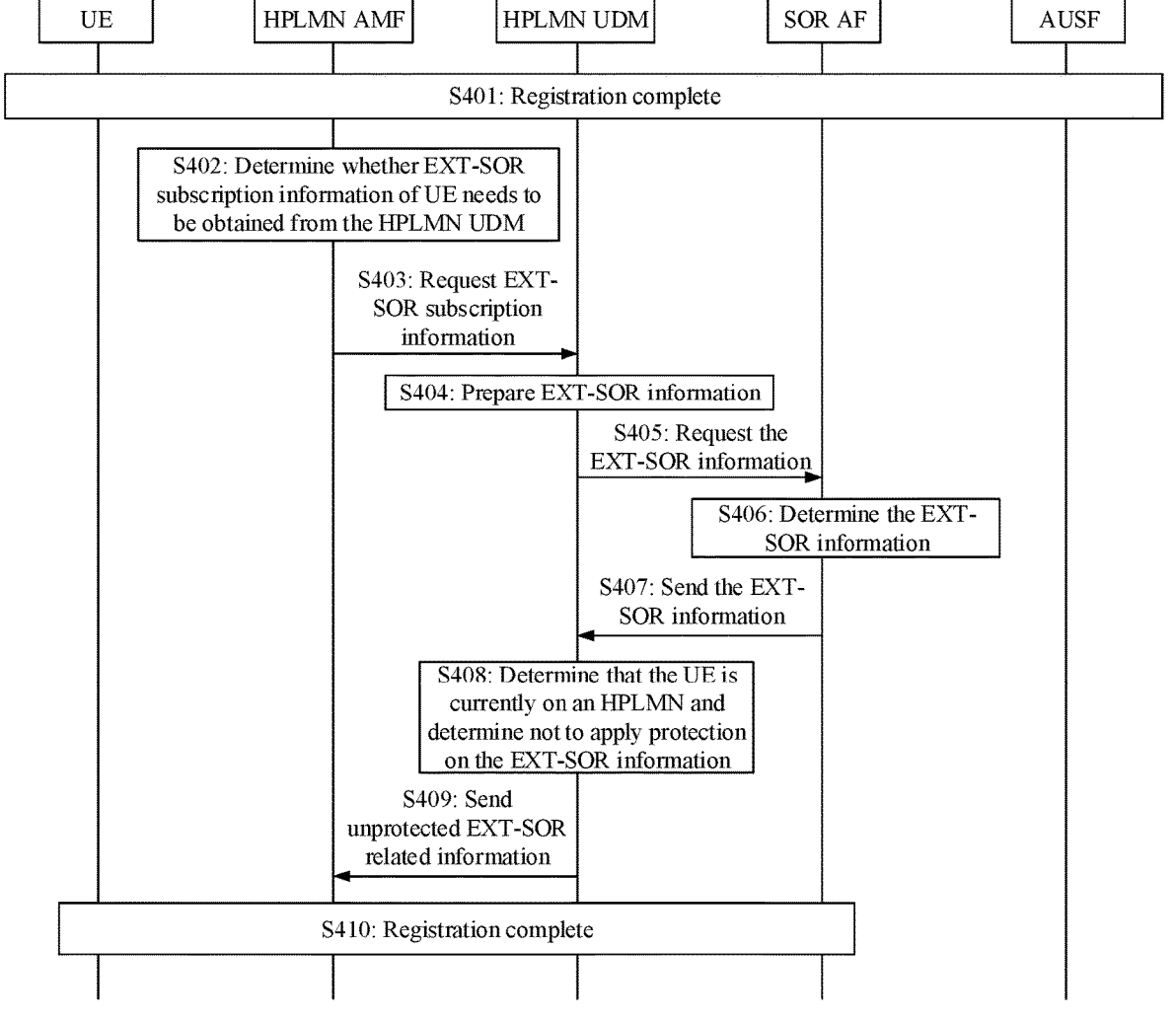
FIG. 4 is a flowchart of a procedure for providing the SOR-CMCI for steering of UE in HPLMN during registration according to an embodiment of this application.

Table 2 and Table 3 indicate that the SOR (transparent container information element) carries protected EXT-SOR related information. EXT-SOR information 1 and information 2 are part of the newly carried EXT-SOR related information, such as information indicating a high-priority service. SOR header-new, SOR-MAC-IAUSF-new, and CounterSOR-new are parts that need to be modified, and need to be modified as capable of indicating that the SOR transparent container IE includes EXT-SOR information (such as EXT-SOR related information protected by USIM) or EXT-SOR information 2 (such as EXT-SOR related information not protected by USIM), and related security information, as shown in FIG. 4.

TABLE 4

| 8 | 7 | 6 | 5 | 4 | 3 | 2 | 1 | |
| --- | --- | --- | --- | --- | --- | --- | --- | --- |
| 0 Spare | 0 Spare | 0 Spare | Carry EXT-SOR informa-tion | ACK | List type | List indica-tion | SOR data type | octet 4 |

For whether to carry EXT-SOR information (octet 4, bit 6):

0 indicates that the SOR transparent container does not carry EXT-SOR information; and 1 indicates that the SOR transparent container carries EXT-SOR information.

In addition, SOR-MAC-IAUSF-new computation also corresponds to content of the SOR transparent container IE. That is, if the SOR transparent container IE carries EXT-SOR, an SOR-MAC-IAUSF-new computation procedure includes EXT-SOR. If the SOR transparent container IE does not carry EXT-SOR, the SOR-MAC-IAUSF-new computation procedure does not include EXT-SOR.

CounterSOR-new also corresponds to the content of the SOR transparent container IE. That is, if the SOR transparent container IE carries EXT-SOR, an SOR-MAC-IAUSF-new computation procedure indicates existence (or transmission) of EXT-SOR. If the SOR transparent container IE does not carry EXT-SOR, the SOR-MAC-IAUSF-new computation procedure does not indicate existence (or transmission) of EXT-SOR.

As shown in Table 5, IEs also include an EXT-SOR transparent container.

TABLE 5

| IEI | Information Element | Type/Reference | Presence | Format | Length |
| --- | --- | --- | --- | --- | --- |
| | Extended protocol discriminator | Extended protocol discriminator 9.2 | M | V | 1 |
| | Security header type | Security header type 9.3 | M | V | 1/2 |
| | Spare half octet | Spare half octet 9.5 | M | V | 1/2 |
| | Registration accept message identity | Message type 9.7 | M | V | 1 |
| | 5GS registration result | 5GS registration result 9.11.3.6 | M | LV | 2 |
| 77 | 5G-GUTI | 5GS mobile identity 9.11.3.4 | O | TLV-E | 14 |
| 4A | Equivalent PLMNs | PLMN list 9.11.3.45 | O | TLV | 5-47 |
| 54 | TAI list | 5GS tracking area identity list 9.11.3.9 | O | TLV | 9-114 |
| 15 | Allowed NSSAI | NSSAI 9.11.3.37 | O | TLV | 4-74 |
| 11 | Rejected NSSAI | Rejected NSSAI 9.11.3.46 | O | TLV | 4-42 |
| 31 | Configured NSSAI | NSSAI 9.11.3.37 | O | TLV | 4-146 |
| 21 | 5GS network feature support | 5GS network feature support 9.11.3.5 | O | TLV | 3-5 |
| 50 | PDU session status | PDU session status 9.11.3.44 | O | TLV | 4-34 |
| 26 | PDU session reactivation result | PDU session reactivation result 9.11.3.42 | O | TLV | 4-34 |
| 72 | PDU session reactivation result error cause | PDU session reactivation result error cause 9.11.3.43 | O | TLV-E | 5-515 |
| 79 | LADN information | LADN information 9.11.3.30 | O | TLV-E | 12-1715 |
| B- | MICO indication | MICO indication 9.11.3.31 | O | TV | 1 |
| 9- | Network slicing indication | Network slicing indication 9.11.3.36 | O | TV | 1 |
| 27 | Service area list | Service area list 9.11.3.49 | O | TLV | 6-114 |
| 5E | T3512 value | GPRS timer 3 9.11.2.5 | O | TLV | 3 |
| 5D | Non-3GPP de-registration timer value | GPRS timer 2 9.11.2.4 | O | TLV | 3 |
| 16 | T3502 value | GPRS timer 2 9.11.2.4 | O | TLV | 3 |
| 34 | Emergency number list | Emergency number list 9.11.3.23 | O | TLV | 5-50 |
| 7A | Extended emergency number list | Extended emergency number list 9.11.3.26 | O | TLV-E | 7-65538 |
| 73 | SOR transparent container | SOR transparent container 9.11.3.51 | O | TLV-E | 20-n |
| 78 | EAP message | EAP message 9.11.2.2 | O | TLV-E | 7-1503 |
| A- | NSSAI inclusion mode | NSSAI inclusion mode 9.11.3.37A | O | TV | 1 |
| 76 | Operator-defined access category definitions | Operator-defined access category definitions 9.11.3.38 | O | TLV-E | 3-n |
| 51 | Negotiated DRX parameters | 5GS DRX parameters 9.11.3.2A | O | TLV | 3 |
| D- | Non-3GPP NW policies | Non-3GPP NW provided policies 9.11.3.36A | O | TV | 1 |
| 60 | EPS bearer context status | EPS bearer context status 9.11.3.23A | 0 | TLV | 4 |
| 6E | Negotiated extended DRX parameters | Extended DRX parameters 9.11.3.26A | O | TLV | 3 |
| 6C | T3447 value | GPRS timer 3 9.11.2.5 | O | TLV | 3 |
| 6B | T3448 value | GPRS timer 3 9.11.2.4 | O | TLV | 3 |
| 6A | T3324 value | GPRS timer 3 9.11.2.5 | O | TLV | 3 |
| 67 | UE radio capability ID | UE radio capability ID 9.11.3.68 | O | TLV | 3-n |
| 68 | UE radio capability ID deletion indication | UE radio capability ID deletion indication 9.11.3.69 | O | TV | 1 |

TABLE 5-continued

| IEI | Information Element | Type/Reference | Presence | Format | Length |
|---|---|---|---|---|---|
| 39 | Pending NSSAI | NSSAI 9.11.3.37 | O | TLV | 4-146 |
| 74 | Ciphering key data | Ciphering key data 9.11.3.18C | O | TLV-E | 34-n |
| 75 | CAG information list | CAG information list 9.11.3.18A | O | TLV-E | 3-n |
| 1B | Truncated 5G-S-TMSI configuration | Truncated 5G-S-TMSI configuration 9.11.3.70 | O | TLV | 3 |
| 1C | Negotiated WUS assistance information | WUS assistance information 9.11.3.71 | O | TLV | 3-n |
| 29 | Negotiated NB-N1 mode DRX parameters EXT-SOR transparent container | NB-N1 mode DRX parameters 9.11.3.73 | O | TLV | 3 |

Figure 6:
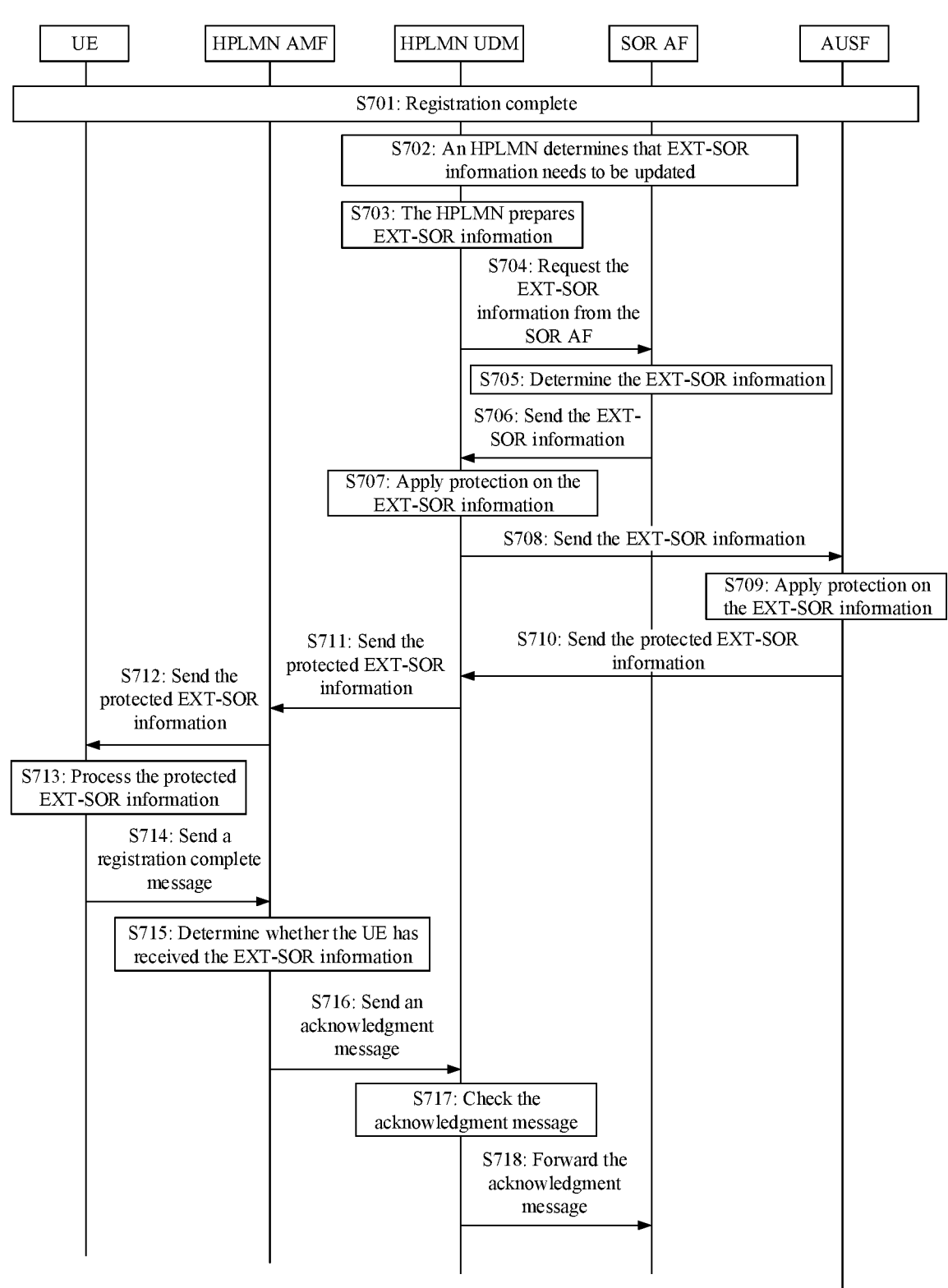
FIG. 6 is a flowchart of updating information corresponding to EXT-SOR by a network-side device according to an embodiment of this application.

The EXT-SOR transparent container is an IE used to carry EXT-SOR related information, such as EXT-SOR information 1 or 2. It may also carry EXT-SOR security information, such as MAC and counter, as shown in FIG. 6.

TABLE 6

| | 8 | 7 | 6 | 5 | 4 | 3 | 2 | 1 | |
|---|---|---|---|---|---|---|---|---|---|
| EXT-SOR transparent container IEI | | | | | | | | | octet 1 |
| Length of EXT-SOR transparent container contents | | | | | | | | | octet 2 |
| | | | | | | | | | octet 3 |
| EXT-SOR header | | | | | | | | | octet 4 |
| EXT-SOR-MAC-1 | | | | | | | | | octet 5-20 |
| CounterEXT-SOR (counter) | | | | | | | | | octet 21-22 |
| EXT-SOR information 1 or 2 | | | | | | | | | octet 23*-n* |

The EXT-SOR header indicates a characteristic of EXT-SOR, for example, whether it is EXT-SOR information sent by a network to UE, or EXT-SOR information by UE to a network; valid range of the EXT-SOR information, such as whether a time limit is present, and whether a PLMN limit is present.

EXT-SOR-MAC-1 indicates a checksum generated after an integrity protection algorithm is executed on EXT-SOR information 1 or 2.

CounterEXT-SOR indicates a counter value required for executing an integrity protection algorithm on EXT-SOR information 1 or 2.

In an optional implementation of this embodiment of this application, based on manner (1), a manner of receiving first information corresponding to extended steering of roaming EXT-SOR and sent by a network-side device in step S11 may further include:

Step S11-1: The terminal sends a notification message to the network-side device, where the notification message is used to notify the network-side device that the terminal supports an EXT-SOR capability.

Step S11-2: The terminal receives the first information corresponding to EXT-SOR and sent by the network-side device.

For a manner of sending a notification message to the network-side device in step S11-1, a procedure for the network-side device includes the following steps. A specific application scenario in which a registration request message is used to notify the network-side device that the terminal supports the EXT-SOR capability is used as an example.

Step S21: The network-side device checks whether the registration request message sent by the terminal indicates "UE supports EXT-SOR capability". If the message indicates "UE supports EXT-SOR capability", step S23 is performed; otherwise, step S22 is performed.

Step S22: The network-side device determines that the terminal does not support the EXT-SOR capability.

Step S23: The network-side device determines that the terminal supports the EXT-SOR capability. A VPLMN AMF needs to obtain EXT-SOR related information of UE from an HPLMN.

Step S24: The AMF determines whether it has latest EXT-SOR related information. If yes, step S25 is performed; if not, step S26 is performed.

Step S25: In a special scenario, such as initial registration and emergent registration, home public land mobile network (HPLMN) unified data management (UDM) may require the access and mobility management function (AMF) to re-obtain EXT-SOR related information. A visited (Visited Public Land Mobile Network, VPLMN) AMF determines whether this is the case. If yes, step S26 is performed; otherwise, the AMF does not re-obtain EXT-SOR related information.

Step S26: The VPLMN AMF requests to obtain EXT-SOR related information from the HPLMN UDM.

In another optional implementation of this embodiment of this application, in a specific application scenario, the network-side device may also determine, based on subscription information, whether the terminal supports the EXT-SOR capability. A specific procedure is as follows:

Step S31: After receiving the registration request message, the VPLMN AMF determines, based on subscription information of UE, whether the UE supports the EXT-SOR capability.

If the VPLMN AMF does not have the subscription information of the UE, the VPLMN AMF obtains the subscription information of the UE from the HPLLMN UDM. If the UE does not support the EXT-SOR capability, an EXT-SOR-related action is stopped; otherwise, step S32 is performed.

Step S32: The AMF determines how to obtain the EXT-SOR related information.

It should be noted that a specific procedure of step S32 is equivalent to step S23 to step S26.

It should be noted that a 5GMM (5G System Mobility Management) capability in the notification message is used to indicate to the network-side device that the terminal supports the EXT-SOR capability. In a specific application scenario, the 5GMM capability is shown as an IE with an IEI of 10 in Table 7.

TABLE 7

| IEI | Information Element | Type/Reference | Presence | Format | Length |
|---|---|---|---|---|---|
| | Extended protocol discriminator | Extended protocol discriminator 9.2 | M | V | 1 |
| | Security header type | Security header type 9.3 | M | V | 1/2 |
| | Spare half octet | Spare half octet 9.5 | M | V | 1/2 |

TABLE 7-continued

| IEI | Information Element | Type/Reference | Presence | Format | Length |
|---|---|---|---|---|---|
| | Registration request message identity | Message type 9.7 | M | V | 1 |
| | 5GS registration type | 5GS registration type 9.11.3.7 | M | V | 1/2 |
| | ngKSI | NAS key set identifier 9.11.3.32 | M | V | 1/2 |
| | 5GS mobile identity | 5GS mobile identity 9.11.3.4 | M | LV-E | 6-n |
| C- | Non-current native NAS key set identifier | NAS key set identifier 9.11.3.32 | O | TV | 1 |
| 10 | 5GMM capability | 5GMM capability 9.11.3.1 | O | TLV | 3-15 |
| 2E | UE security capability | UE security capability 9.11.3.54 | O | TLV | 4-10 |
| 2F | Requested NSSAI | NSSAI 9.11.3.37 | O | TLV | 4-74 |
| 52 | Last visited registered TAI | 5GS tracking area identity 9.11.3.8 | O | TV | 7 |
| 17 | S1 UE network capability | S1 UE network capability 9.11.3.48 | O | TLV | 4-15 |
| 40 | Uplink data status | Uplink data status 9.11.3.57 | O | TLV | 4-34 |
| 50 | PDU session status | PDU session status 9.11.3.44 | O | TLV | 4-34 |
| B- | MICO indication | MICO indication 9.11.3.31 | O | TV | 1 |
| 2B | UE status | UE status 9.11.3.56 | O | TLV | 3 |
| 77 | Additional GUTI | 5GS mobile identity 9.11.3.4 | O | TLV-E | 14 |
| 25 | Allowed PDU session status | Allowed PDU session status 9.11.3.13 | O | TLV | 4-34 |
| 18 | UE's usage setting | UE's usage setting 9.11.3.55 | O | TLV | 3 |
| 51 | Requested DRX parameters | 5GS DRX parameters 9.11.3.2A | O | TLV | 3 |
| 70 | EPS NAS message container | EPS NAS message container 9.11.3.24 | O | TLV-E | 4-n |
| 74 | LADN indication | LADN indication 9.11.3.29 | O | TLV-E | 3-811 |
| 8- | Payload container type | Payload container type 9.11.3.40 | O | TV | 1 |
| 7B | Payload container | Payload container 9.11.3.39 | O | TLV-E | 4-65538 |
| 9- | Network slicing indication | Network slicing indication 9.11.3.36 | O | TV | 1 |
| 53 | 5GS update type | 5GS update type 9.11.3.9A | O | TLV | 3 |
| 41 | Mobile station classmark 2 | Mobile station classmark 2 9.11.3.31C | O | TLV | 5 |
| 42 | Supported codecs | Supported codec list 9.11.3.51A | O | TLV | 5-n |
| 71 | NAS message container | NAS message container 9.11.3.33 | O | TLV-E | 4-n |
| 60 | EPS bearer context status | EPS bearer context status 9.11.3.23A | O | TLV | 4 |
| 6E | Requested extended DRX parameters | Extended DRX parameters 9.11.3.26A | O | TLV | 3 |
| 6A | T3324 value | GPRS timer 3 9.11.2.5 | O | TLV | 3 |
| 67 | UE radio capability ID | UE radio capability ID 9.11.3.68 | O | TLV | 3-n |
| 35 | Requested mapped NSSAI | Mapped NSSAI 9.11.3.31B | O | TLV | 3-42 |
| 48 | Additional information requested | Additional information requested 9.11.3.12A | O | TLV | 3 |
| 1A | Requested WUS assistance information | WUS assistance information 9.11.3.71 | O | TLV | 3-n |
| XX | N5GC indication | N5GC indication 9.11.3.72 | O | T | 1 |
| 30 | Requested NB-N1 mode DRX parameters | NB-N1 mode DRX parameters 9.11.3.73 | O | TLV | 3 |

In addition, the 5GMM capability information element is intended to provide information related to 5GCN or UE in communication with EPS for a network. Content may affect a manner of processing a UE operation by the network.

Table 8 shows coding of the 5GMM capability information element. The 5GMM capability is a type 4 information element with a minimum length of three octets and a maximum length of 15 octets.

TABLE 8

| 8 | 7 | 6 | 5 | 4 | 3 | 2 | 1 | |
|---|---|---|---|---|---|---|---|---|
| | | | 5GMM capability IEI | | | | | octet 1 |
| | | Length of 5GMM capability contents | | | | | | octet 2 |
| SGC | 5G-IPHC-CP CIoT | N3 data | 5G-CP CIoT | Restrict EC | LPP | HO attach | S1 mode | octet 3 |
| RACS | NSSAA | 5G-LCS | V2XC NPC5 | V2XCE PC5 | V2X | 5G-UP CIoT | 5GSRV CC | octet 4* |
| 0 | 0 | 0 | EXT-SOR capability | 5G-EHC-CP CIoT | multiple UP | WUSA | CAG | Octet 5* |
| 0 | 0 | 0 | 0 | 0 | 0 | 0 | 0 | octet 6*-15* |
| | | | Spare | | | | | |

EXT-SOR capability (octet 5, bit 5): 0 indicates that the EXT-SOR capability is not supported, and 1 indicates that the EXT-SOR capability is supported.

Optionally, the notification message in this embodiment of this application includes at least one of the following: a registration request message, an uplink non-transport-layer transport message, and a protocol data unit session message.

Optionally, in this embodiment of this application, a manner of determining, based on the first information, whether the target service is present in the currently ongoing service on the terminal in step 12 of manner (1) includes one of the following:

(1) The terminal determines, based on the first information, whether the target service is present in the currently ongoing service on the terminal.

(2) The terminal determines, based on the first information, and/or subscription information stored in the terminal, and/or a target service agreed between the terminal and the network-side device, and/or a target service defined by the terminal, whether the target service is present in the currently ongoing service on the terminal.

In other words, the terminal may determine, only based on the first information, whether the target service is present in the currently ongoing service on the terminal. Determining may be further made in combination with another manner, for example, based on the target service agreed between the terminal and the network-side device.

In an optional implementation of this embodiment of this application, a manner of releasing the currently ongoing service on the terminal in step S204 in this embodiment of this application may further include:

Step S204-11: The terminal immediately releases the currently ongoing service on the terminal based on an indication of the first information.

Step S204-12: The terminal releases the currently ongoing service on the terminal after a preset time period based on an indication of the first information.

Step S204-12 may further include: The terminal starts a timer based on the indication of the first information, and in a case that the timer expires, releases the currently ongoing service on the terminal.

Through step S204-11 and step S204-12, the terminal may immediately release the currently ongoing service on the terminal, or may determine a time period by using a timer before releasing.

In an optional implementation of this embodiment of this application, the method in this embodiment of this application may further include the following steps.

Step S208: The terminal receives, before the timer expires, second information corresponding to EXT-SOR and sent by the network-side device, where the second information is information updated from the first information.

Step S210: The terminal stops the timer, overwrites the first information with the second information, and determines, based on the second information, whether the target service is present in the currently ongoing service on the terminal; or discards the second information, and in a case that the timer expires, releases the currently ongoing service on the terminal based on the first information.

It can be learned from step S208 and step S210 that the network-side device may continuously send information corresponding to EXT-SOR to the terminal. After receiving a plurality of pieces of information corresponding to EXT-SOR, the terminal determines whether to overwrite previous information with subsequently received information. This is because a target service indicated by the subsequently received information corresponding to EXT-SOR may not be the same.

A manner of autonomously determining whether the target service is present in the currently ongoing service on the terminal in manner (2) may further include: The terminal autonomously determines, based on subscription information stored in the terminal, and/or a target service agreed between the terminal and the network-side device, and/or a target service defined by the terminal, whether the target service is present in the currently ongoing service on the terminal.

Based on manner (2), a manner of releasing the currently ongoing service on the terminal may further include: The terminal determines to immediately release the currently ongoing service on the terminal; or the terminal determines to release the currently ongoing service on the terminal after a preset time period that is defined by the terminal.

Based on manner (2), a manner of releasing the currently ongoing service on the terminal after a preset time period may further include: The terminal determines to start a timer and, in a case that the timer expires, releases the currently ongoing service on the terminal.

In an optional implementation of this embodiment of this application, the method in this embodiment of this application may further include the following steps.

Step S212: In a case that the target service is present in the currently ongoing service on the terminal, the terminal determines whether the target service has ended.

Step S214: In a case that the target service has ended, the terminal determines that the target service is not present in the currently ongoing service on the terminal.

It can be learned from step S212 and step S214 that if the target service is present in the currently ongoing service on the terminal, the terminal determines, only after determining that the target service has ended, that the target service is not present in the currently ongoing service on the terminal. For example, if the target service is a high-priority service, a case that a high-priority service is present in the currently ongoing service means the terminal currently has an important service to execute and cannot implement network transferring. Network transferring can be implemented only after the currently ongoing high-priority service has ended, which means the important service has ended and the currently ongoing service is no longer an important service.

Based on manner (1), the method in this embodiment of this application may further include the following steps.

Step S216: The terminal determines whether a visited public land mobile network VPLMN in the network-side device has changed.

Step S218: In a case that the VPLMN has changed, the terminal deletes the first information, or determines, based on the first information, whether the target service is present in the currently ongoing service on the terminal.

It can be learned from step S216 and step S218 that if the VPLMN has changed, the terminal may delete the first information, or may continue to determine, based on the first information, whether the target service is present in the currently ongoing service on the terminal. A specific manner may be determined based on an actual situation.

Based on manner (1), after the first information sent by the network-side device is received, the method in this embodiment of this application may further include:

Step S220: Perform security detection on the first information, where the security detection includes integrity check and/or decryption detection.

Step S222: Determine, in a case that the security detection on the first information succeeds, whether a VPLMN in the network-side device has changed.

Step S224: Send feedback information to the network-side device in a case that the VPLMN in the network-side device does not change, where the feedback information is used to indicate that the terminal has received the first information.

A manner of sending feedback information to the network-side device in step S224 may further include:

Step S224-11: Apply protection on the feedback information, where the protection includes integrity protection and/or encryption protection.

Step S224-12: Send the feedback information obtained through protection to the network-side device by using a registration termination message or an uplink non-access stratum transport message.

In step S220 to step S224, the terminal needs to perform security detection on the received first information, because the first information sent by the network-side device is possibly information with low security. That is, a misoperation of network transferring based on the information with low security may be performed. Likewise, the terminal side needs to apply protection on the feedback information to be sent to the network-side device, so as to ensure security of the feedback information.

It should be noted that a key used for protection is generated during authentication between the UE and the network, and may be confirmed during a security process. A KDF algorithm may be used for protection, for example, generating a checksum by using the KDF algorithm.

In a specific application scenario of this embodiment of this application, an SOR header-new or EXT-SOR header-new in the feedback information is used to indicate that the terminal has received the first information. The SOR header-new is shown in Table 9.

TABLE 9

| SOR transparent container IEI | octet 1 |
| Length of SOR transparent container contents | octet 2 |
| | octet 3 |
| SOR header-new | octet 4 |
| SOR-MAC-IUE-new | octet 5-20 |

The SOR header-new includes an indication that the UE feeds back to the network that it has successfully received the information corresponding to EXT-SOR, as shown in Table 10.

TABLE 10

| 8 | 7 | 6 | 5 | 4 | 3 | 2 | 1 |
|---|---|---|---|---|---|---|---|
| 0 Spare | 0 Spare | 0 Spare | 0 Spare | 0 Spare | 0 Spare | EXT-SOR data type | SOR octet 4 data type |

In a case that a value of the EXT-SOR data type field is 0, the EXT-SOR transparent container carries extended steering of roaming information. In a case that the value of the EXT-SOR data type field is 1, the EXT-SOR transparent container carries an acknowledgment that the extended steering of roaming information is successfully received.

SOR-MAC-IUE-new: a checksum of SOR header-new information obtained through integrity protection.

The EXT-SOR header-new is shown in Table 11.

TABLE 11

| EXT-SOR transparent container IEI | octet 1 |
| Length of EXT-SOR transparent container contents | octet 2 |
| | octet 3 |
| EXT-SOR header-new | octet 4 |
| EXT-SOR-MAC-IUE-new | octet x-y |

The EXT-SOR header-new includes an indication that the UE feeds back to the network that it has successfully received the information corresponding to EXT-SOR, as shown in Table 12.

TABLE 12

| 8 | 7 | 6 | 5 | 4 | 3 | 2 | 1 |
|---|---|---|---|---|---|---|---|
| 0 Spare | 0 Spare | 0 Spare | 0 Spare | 0 Spare | 0 Spare | 0 Spare | EXT-SOR octet 4 data type |

In a case that the value of the EXT-SOR data type field is 0, the EXT-SOR transparent container carries the extended steering of roaming information. In a case that the value of the EXT-SOR data type field is 1, the EXT-SOR transparent container carries an acknowledgment that the extended steering of roaming information is successfully received.

EXT-SOR-MAC-IUE-new is a checksum of EXT-SOR header-new information obtained through integrity protection. EXT-SOR transparent container IEI is an identifier of an information element corresponding to the EXT-SOR transparent container.

In an optional implementation of this embodiment of this application, after the first information is received, the method in this embodiment of this application may further include the following step.

Step S226: The terminal stores the first information in a universal subscriber identity module USIM or mobile equipment ME.

In another optional implementation of this embodiment of this application, the method in this embodiment of this application may further include the following step.

Step S228: The terminal exchanges the first information with a user via an AT interface.

In a specific application scenario, a manner of exchanging the first information with a user via an AT interface may be as follows.

(1) The terminal may exchange EXT-SOR related information with the user via the AT interface. In other words, the user may query the EXT-SOR related information from the UE via the AT interface, or the UE may proactively reports a change in the EXT-SOR related information via the AT interface.

(2) The terminal may show the EXT-SOR information received by the UE to the user via the AT interface, or may show the EXT-SOR information stored in the UE to the user via the AT interface.

(3) The UE may proactively show to the user, for example, show to the user each time when the UE receives the EXT-SOR related information of the network-side device; or may feed back the EXT-SOR related information to the user upon user query. The EXT-SOR related information may also include information such as the network-side device's expectation that the UE transfers to a target PLMN.

The following describes an entire registration procedure in this embodiment of this application by using an example. This example shows a registration procedure in which a network-side device determines that EXT-SOR information camps on a VPLMN. As shown in FIG. 3, the registration procedure includes the following steps.

Step S301: UE may check an EXT-SOR capability of the UE. If the UE supports the EXT-SOR capability, a REG REQ message carries an indication: UE supports EXT-SOR capability; or if the UE does not support the EXT-SOR capability, the indication is not carried.

It should be noted that the UE may not check the EXT-SOR capability of the UE. That is, the indication "UE supports EXT-SOR capability" is not sent to the network-side device by using an air interface message, but is determined by the network-side device based on subscription information stored in the network-side device. In this case, the UE and an HPLMN UDM need to store subscription information of the UE and network-side device, such as the EXT-SOR capability of the UE, and/or whether the UE requires the network-side device to return the EXT-SOR related information in a specific scenario, such as a registration procedure.

Step S302: The UE sends a registration request message to the network-side device.

Step S303: The network-side device completes mutual authentication and key negotiation with the UE.

After receiving the registration request message of the UE, the network-side device triggers an authentication and key negotiation process. The authentication includes judgment on validity of the terminal by the network-side device, and judgment on validity of the network-side device by the terminal. The authentication may be completed by using a 5G-AKA or EAP-AKA' algorithm.

During authentication, the network-side device and the terminal may negotiate a key KEY1. The key KEY1 is used in subsequent EXT-SOR transmission and check. The key KEY1 is stored in the HPLMN and UE.

During authentication, if the UE or network-side device finds it unable to determine trustworthiness of the other party's identity, a subsequent EXT-SOR procedure is stopped and the registration procedure ends.

During authentication, if the UE and network-side device mutually determine reliability of the other party's identity, negotiate a key, and determine to use the key, step S304 is performed.

Step S304: A VPLMN AMF determines whether the EXT-SOR related information of the UE needs to be obtained from the HPLMN UDM.

In addition, a judgment procedure may further include:

The VPLMN AMF may assist in judgment based on an operator's configuration.

If the EXT-SOR related information of the UE needs to be obtained from the HPLMN UDM, step S305 is performed.

If the EXT-SOR related information of the UE needs to be obtained from the HPLMN UDM, the existing registration process is performed.

Step S305: The VPLMN AMF requests the EXT-SOR related information of the UE, such as subscription information, from the HPLMN UDM. Alternatively, the VPLMN AMF provides the HPLMN UDM with related information, including a UE ID (terminal identifier), an indication for requesting EXT-SOR related information, or current location information of the UE such as geographical location, PLMN ID (identifier of a home public land mobile network), TA, and CELL.

An interface Nudm_SDM_Get may be used for requesting the EXT-SOR related information of the UE from the HPLMN UDM.

Step S306: The HPLMN UDM prepares the EXT-SOR related information.

The HPLMN UDM prepares the EXT-SOR related information.

(1) The HPLMN UDM performs judgment and determines to perform an EXT-SOR function on the UE. The judgment may be based on the subscription information of the UE, or may be based on HPLMN configuration information, such as a current load.

The HPLMN UDM may determine whether to independently provide the EXT-SOR related information of the UE or obtain the information via an EXT-SOR-AF function of the network-side device. The judgment may be based on an HPLMN policy, such as whether the HPLMN has a policy to call the EXT-SOR-AF. The judgment may also be based on a current configuration, such as whether the HPLMN has the EXT-SOR-AF configured.

If the HPLMN UDM obtains the information via the EXT-SOR-AF, step S307 is performed; or if the HPLMN UDM determines to provide the EXT-SOR related information of the UE, step S310 is performed.

(2) If the HPLMN UDM determines temporarily not to perform the EXT-SOR function on the UE, for example, if the HPLMN UDM temporarily cannot obtain the EXT-SOR related information through calculation nor obtain the EXT-SOR related information from the EXT-SOR-AF, the HPLMN UDM notifies the UE in a manner to indicate that the HPLMN does not require the UE to perform the EXT-SOR function. The manner may include: (1) Skip returning the EXT-SOR related information to the UE. (2) Return information that indicates "HPLMN does not require the UE to perform the EXT-SOR function". After registration, when the HPLMN UDM wants to notify the UE to update the EXT-SOR related information, an EXT-SOR update procedure may be used.

Step S307: The HPLMN UDM requests the EXT-SOR related information from the EXT-SOR-AF.

When requesting the EXT-SOR related information from the EXT-SOR-AF, the HPLMN UDM may provide a UE ID, an indication for requesting the EXT-SOR related information, or current location information of the UE such as geographical location, VPLMN ID, TA, and CELL.

Step S308: The EXT-SOR-AF prepares the EXT-SOR related information for the HPLMN UDM.

The EXT-SOR related information prepared by the EXT-SOR-AF for the HPLMN UDM may be plain text or a protected data packet 1. The protected data packet 1 can be parsed only by a component trusted by the network-side device, such as an encryption and decryption program stored in a USIM or ME.

Step S309: The EXT-SOR-AF sends the EXT-SOR related information to the HPLMN UDM.

Step S310: The HPLMN UDM determines to apply protection on the EXT-SOR related information.

A purpose of the protection is to prevent modification by the VPLMN. Once modification is made by the VPLMN, the UE can identify the modification when performing deprotection.

The determining may be made through judgment, for example, determining that a PLMN on which the UE currently camps is a VPLMN or an untrustworthy network-side device or area. The EXT-SOR related information may be plaintext EXT-SOR related information, or may be protected EXT-SOR related information, such as data packet 1.

Step S311: The HPLMN UDM sends the EXT-SOR related information to a functional unit that is responsible for applying protection on data, such as an AUSF.

Step S312: An authorization server function (AUSF) applies protection on the received EXT-SOR.

A protection algorithm uses the key obtained through negotiation in step S303.

Step S313: The AUSF sends the protected EXT-SOR related information to the HPLMN UDM.

Step S314: The HPLMN UDM sends the protected EXT-SOR related information to the VPLMN AMF.

Step S315: The VPLMN AMF forwards the protected EXT-SOR related information to the UE.

The VPLMN AMF adds the protected EXT-SOR related information to a registration success message, that is, a REGISTRATION ACCEPT message.

Step S316: The UE processes the protected EXT-SOR related information.

After receiving the REGISTRATION ACCEPT message, the UE processes the protected EXT-SOR related information.

Step S317: The UE feeds back REGISTRATION COMPLETE.

If the UE finds, through check, that the VPLMN does not modify or discard the protected EXT-SOR related information, the UE feeds back to the HPLMN reception of the EXT-SOR related information. The feedback information may be included in REGISTRATION COMPLETE.

Step S318: The VPLMN AMF determines whether a message sent by the UE includes an acknowledgment that the information corresponding to EXT-SOR has been received.

If the VPLMN AMF finds, upon reception, that the REGISTRATION COMPLETE message includes EXT- SOR acknowledgment information, the VPLMN AMF determines to forward the acknowledgment information to the HPLMN UDM.

Step S319: The VPLMN AMF forwards the acknowledgment information to the HPLMN UDM.

Step S320: The HPLMN UDM checks the EXT-SOR acknowledgment information.

Step S321: The HPLMN UDM forwards the acknowledgment information to the EXT-SOR-AF.

If the EXT-SOR-AF requires the UE to acknowledge reception of the EXT-SOR related information, the HPLMN UDM forwards the acknowledgment information to the EXT-SOR-AF.

Step S322: The EXT-SOR-AF checks the EXT-SOR acknowledgment information.

If the check succeeds, the procedure ends; or if the check fails, the EXT-SOR-AF may resend the EXT-SOR related information. After the number of resend attempts required is reached, the VPLMN may be considered to be unreliable, and the UE is required to exit the current VPLMN, for example, to perform de-registration on the current VPLMN.

It should be noted that the network-side device determines that the EXT-SOR information may camp on the HPLMN. When the UE camps on the HPLMN, the HPLMN may use a protected form for indicating EXT-SOR related information to the UE, because the HPLMN is trustworthy. That is, the EXT-SOR related information is obtained in a same manner used when the UE camps on the VPLMN. The procedure is the same as the registration procedure for camping (camp) on the VPLMN. An unprotected form can also be used. The unprotected form means that the HPLMN UDM sends the EXT-SOR related information to the HPLMN AMF in plain text. Then the HPLMN AMF sends the information in an air interface NAS message to the UE. The HPLMN AMF determines, based on a requirement of an existing protocol, whether to perform security protection for the NAS message, such as encryption and integrity protection. As shown in FIG. 4, the registration procedure includes:

Step S401: When camping on an HPLMN, UE initiates registration and completes authentication and security check.

Step S402: An AMF determines whether to request EXT-SOR related information from the UDM.

It should be noted that steps S403 to S407 are the same as steps S305 to S309.

Step S408: The UDM determines that the UE is currently on the HPLMN and determines not to apply protection on the EXT-SOR related information.

Step S409: The UDM sends the unprotected EXT-SOR related information to the HPLMN AMF.

Step S410: The HPLMN AMF adds the unprotected EXT-SOR related information to a registration success message and sends it to the UE.

The UE determines, based on a fact that it is currently on the HPLMN, that the UE can accept the unprotected EXT-SOR related information.

Processing on the EXT-SOR related information is the same as steps S504 to S512. If it is required to feed back to the HPLMN UDM that the EXT-SOR related information has been received, plaintext feedback information may be added to a registration complete message and sent to the network.

In a specific application scenario, based on step S301 to step S322, processing of the UE on the information corresponding to EXT-SOR and sent by the network may further include:

Step S501: The UE receives a NAS message sent by a network.

Step S502: The UE checks whether the NAS message includes EXT-SOR related information. If the UE finds that the network does not provide an EXT-SOR-related parameter, an EXT-SOR function is not performed. In this case, the UE may consider that the network or VPLMN does not want the UE to perform this function. If the EXT-SOR related information is included, step S503 is performed.

Step S503: The UE performs security check on the EXT-SOR related information to check whether the VPLMN has modified the EXT-SOR.

If the security check succeeds, step S503-11 is performed; otherwise, step S513 is performed.

Step S503-11: The UE checks whether the PLMN on which the UE currently camps is a qualified PLMN.

If the PLMN on which the UE currently camps is a qualified PLMN, for example, if the PLMN is not an HPLMM, EHPLMN, or user controlled PLMN selector with access technology, step S503-13 is performed to check a condition of a network selection mode.

If the PLMN on which the UE currently camps is an unqualified PLMN, for example, if the PLMN is an HPLMM, EHPLMN, or user controlled PLMN selector with access technology, step S503-12 is performed.

Step S503-12: The UE stores the EXT-SOR related information that is received.

If the current PLMN changes from an unqualified PLMN to another unqualified PLMN, the EXT-SOR related information may remain valid or may be considered to be invalid.

If the current PLMN changes from an unqualified PLMN to a qualified PLMN, the EXT-SOR related information may remain valid or be deleted.

Step S503-13: The UE checks whether the current network selection mode of the UE is an automatic network selection mode. If the UE uses the automatic network selection mode, step S504 is performed. If the UE uses a manual network selection mode, the UE stores the received EXT-SOR related information and performs no operation.

If the UE changes from the manual network selection mode to the automatic network selection mode, step S503-11 is performed again.

A further check may be performed to check whether the current VPLMN in the current automatic network selection mode is the VPLMN that receives the currently stored EXT-SOR. A subsequent action 1 of the UE is determined based on a check result. The subsequent action 1 of the UE may include:

(1) If the current VPLMN is the VPLMN that receives the currently stored EXT-SOR, the currently stored EXT-SOR is considered to remain valid.

(2) If the current VPLMN is no longer the VPLMN that receives the currently stored EXT-SOR, the currently stored EXT-SOR is considered to remain valid.

(3) If the current VPLMN is no longer the VPLMN that receives the currently stored EXT-SOR, the currently stored EXT-SOR is considered to be invalid.

Step S504: The UE checks whether the EXT-SOR needs to be sent to a USIM or a dedicated program for parsing. If yes, step S505 is performed; otherwise, the de-protected EXT-SOR related information is written to an ME and then step S506 is performed.

Before step S504 is performed, the following conditions are checked: The UE is on the VPLMN, the UE uses the automatic network selection mode, and security check is performed on the EXT-SOR. No limitation is imposed on an order of checking these conditions, as long as these conditions are all satisfied.

Step S505: The USIM or the dedicated program parses the EXT-SOR related information, sends the EXT-SOR related information obtained through parsing to the UE, and then performs step S506.

Step S506: The UE uses a parameter to check whether the UE has a high-priority service on going. If yes, step S508 is performed; otherwise, step S507 is performed.

The UE may also use its self-defined standard to check whether there is a high-priority service. For example, if the UE considers an ongoing service to be a high-priority service, the service may not fall within a range of high-priority services determined by the network.

The self-defined standard of the UE may be defined by a user or may be defined by the UE in advance. If the standard is defined by the user, the user may query, set, modify, and delete an EXT-SOR-related parameter stored in the UE. The UE may also proactively report any change of the parameter to the user. When the user performs an operation on the EXT-SOR-related parameter, an AT command interface, API interface, or another message interface may be used.

Step S507: The UE stores the EXT-SOR related information. If the UE already has EXT-SOR related information stored, the existing EXT-SOR related information is overwritten. When the UE stores the EXT-SOR related information, it may store corresponding information about a current VPLMN, such as a VPLMN ID, which indicates that the EXT-SOR related information is received on the VPLMN.

Step S508: After the ongoing high-priority service ends, the UE may continue to apply the EXT-SOR related information that is stored in the UE, regardless of whether the PLMN of the UE has changed.

If the UE finds that the PLMN has changed during execution of the high-priority service, it may consider the EXT-SOR related information that is received on the previous PLMN to remain valid or become invalid.

Step S509: It is determined whether the UE currently has an ongoing high-priority service. If yes, S510 is performed; or if not, the UE releases a connection, enters the idle state, and performs step S512.

Step S510: The UE calculates a time required for stopping the current service and determines a period of a timer TIMER1. The period may be set to a default value, may be determined by the UE based on implementation (based on UE implementation), may be negotiated with the network, or may be determined by the UE based on indication information, where the indication information is provided by the network in an air interface message. Alternatively, a maximum value may be specified and the period cannot be greater than the maximum value.

If a current timer is not running, the timer TIMER1 is started.

If the current serving PLMN changes during running of the timer TIMER, the currently stored EXT-SOR related information may be considered to be invalid, or the currently stored EXT-SOR related information may be considered to remain valid. Then, judgment is made based on a principle in step S503-11.

Step S511: After the timer expires and the UE checks that all the preceding conditions are satisfied, the UE releases the current service and releases a NAS signaling connection, enters the idle state, and performs step S512. If the conditions are not satisfied, this step continues.

That "all the preceding conditions are satisfied" means all the following conditions are satisfied: The EXT-SOR passes the security check, the current PLMN is a VPLMN with user controlled PLMN selector with access technology, no high-priority service exists, the automatic network selection mode is used, and the duration of the timer meets the requirement.

The release of the current service in step S511 includes the following scenarios:

Scenario 1: If a currently ongoing service of the terminal includes a high-priority service, it is necessary to determine whether the high-priority service has ended. If the high-priority service degrades or the high-priority service has stopped, the current service of the terminal may be released after "all the preceding conditions are satisfied".

Scenario 2: If the terminal only has a low-priority service, the current service of the terminal is released after "all the preceding conditions are satisfied".

Scenario 3: If the terminal only has a low-priority service, the terminal may stop the low-priority service or release the service during running of a timer when "all the preceding conditions are satisfied".

Scenario 4: If the terminal only has a low-priority service, if the terminal enters an unqualified PLMN while executing the low-priority service, the terminal stops the timer and performs step S503.

Step S512: The UE selects a network, where a manner of network selection may be selecting a network by order or selecting a target network specified by the network.

Step S513: If the security check fails, it is determined that the current VPLMN network has modified the EXT-SOR related information, or credibility of the current VPLMN may be determined to decrease. The UE sets the current VPLMN network to a lowest priority.

The UE may immediately release the connection and search for another network. If no other network is available, the UE camps and registers with the current network.

After the UE finds that the VPLMN has modified the EXT-SOR related information, the UE may report the event to the user, or may not inform the user.

Figure 5:
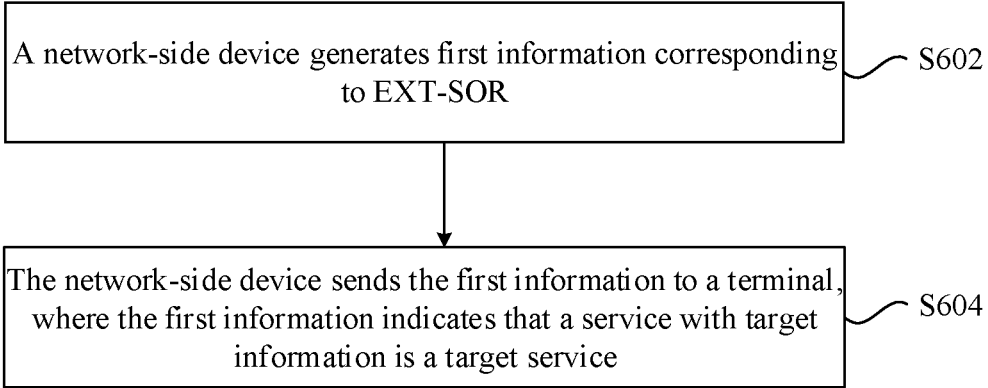
FIG. 5 is a second flowchart of a network transferring method according to an embodiment of this application.

FIG. 2 describes this application from a terminal side. The following describes a network transferring method in this application from a network side. FIG. 5 is a second flowchart of a network transferring method according to an embodiment of this application. As shown in FIG. 5, the method includes the following steps.

Step S602: A network-side device generates first information corresponding to EXT-SOR.

Step S604: The network-side device sends the first information to a terminal, where the first information indicates that a service with target information is a target service.

It should be noted that the target information in this embodiment of this application may include at least one of the following: type of the target service, name of the target service, number of the target service, target network slice selection assistance information S-NSSAI, target data network name DNN, target 5QI, request type of target protocol data unit PDU session, target Internet protocol IP address, and target group filter.

In an optional implementation of this embodiment of this application, a manner of generating the first information by the network-side device in step S602 may further include: A home public land mobile network unified data management HPLMN UDM network element in the network-side device generates the first information.

In an optional implementation of this embodiment of this application, a manner of sending the first information to the terminal by the network-side device in step S604 may further include:

Step S604-11: An HPLMN UDM network element in the network-side device sends the first information to an AMF network element in the network-side device.

Step S604-12: The AMF network element in the network-side device transparently transmits the first information to the terminal.

Optionally, the AMF network element in the network-side device transparently transmits the first information to the terminal via at least one of the following: an SOR transparent container and an EXT-SOR transparent container. The EXT-SOR transparent container includes at least one of the following: EXT-SOR information 1, EXT-SOR information 2, and EXT-SOR security information.

Optionally, before the HPLMN UDM network element in the network-side device sends the first information to the AMF network element in the network-side device, the method further includes: The HPLMN UDM network element in the network-side device requests an authorization server function AUSF network element in the network-side device to apply protection on the first information.

In an optional implementation of this embodiment of this application, after the network-side device sends the first information to the terminal, the method further includes: The network-side device sends second information corresponding to EXT-SOR to the terminal.

For a manner of updating the information corresponding to EXT-SOR by the network-side device, in a specific application scenario of this embodiment of this application, as shown in FIG. 6, an update procedure includes:

Step S701: UE completes registration in a VPLMN.

Step S702: An HPLMN determines that EXT-SOR related information needs to be updated.

Step S703: The HPLMN prepares the EXT-SOR related information. If an HPLMN UDM obtains such information via an EXT-SOR-AF, step S703 is performed.

Step S704: The HPLMN UDM requests the EXT-SOR information from an SOR-AF.

Step S705: The SOR-AF determines EXT-SOR information.

Step S706: The SOR-AF sends the EXT-SOR information.

Step S707: The HPLMN UDM applies protection on the EXT-SOR information.

Step S708: The HPLMN UDM sends the EXT-SOR information to an AUSF.

Step S709: The AUSF applies protection on the EXT-SOR information.

Step S710: The AUSF sends the EXT-SOR information obtained through protection to the HPLMN UDM.

It can be seen that steps S704 to S710 are the same as steps S307 to S313 in FIG. 3.

Step S711: The HPLMN UDM sends the protected and updated EXT-SOR related information to the VPLMN AMF.

Step S712: The VPLMN AMF transparently transmits the protected and updated EXT-SOR related information that is received to the UE in a NAS message, such as an MM message and a DL NAS TRANSPORT (downlink non-access stratum transport) message. The VPLMN AMF cannot modify the protected and updated EXT-SOR related information.

Step S713: After receiving the protected and updated EXT-SOR related information, the UE performs security check, such as integrity check, on the information.

Step S714: If it is required to feed back to the network that the UE has received the updated EXT-SOR related information, the feedback information is protected and sent to the network in an uplink non-access stratum (NAS) message, such as a ULNAS TRANSPORT (uplink non-access stratum transport) message.

Step S715: The VPLMN AMF determines whether the EXT-SOR information is received.

Step S716: The HPLMN AMF sends an acknowledgment message to the HPLMN UDM.

Step S717: The HPLMN UDM checks the acknowledgment message.

Step S718: The HPLMN UDM forwards the acknowledgment message to the SOR-AF.

It should be noted that S715 to S718 in this procedure are the same as steps S318 to S321 in FIG. 3.

This procedure may alternatively be that the network determines to update EXT-SOR information of the UE camping on the HPLMN. That is, after the UE camps on and registers with the HPLMN, the HPLMN is trustworthy. In this case, when the HPLMN indicates the EXT-SOR related information to the UE, a protected form may be used, that is, the same manner used during camping on the VPLMN can be used to update the EXT-SOR related information. In this case, the procedure is the same as the registration procedure for camping on the VPLMN. Alternatively, the UE may be informed by using the EXT-SOR related information that is unprotected. The UE stores the received EXT-SOR related information. The parameter is used when the UE camps on a qualified VPLMN.

It should be noted that the network transferring method provided in this embodiment of this application may be executed by a network transferring apparatus, or a control module in the network transferring apparatus for performing the network transferring method. In this embodiment of this application, an example in which the network transferring apparatus performs the network transferring method is used to describe the network transferring apparatus provided in an embodiment of this application.

Figure 7:
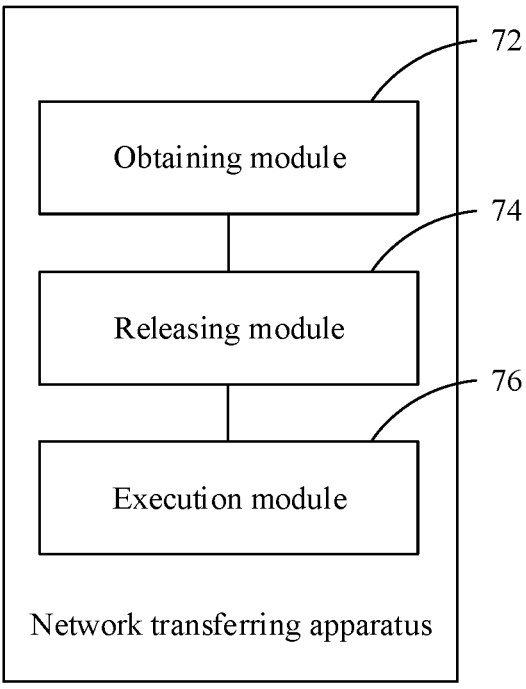
FIG. 7 is a first schematic structural diagram of a network transferring apparatus according to an embodiment of this application.

An embodiment of this application provides a network transferring apparatus. FIG. 7 is a first schematic structural diagram of a network transferring apparatus according to an embodiment of this application. As shown in FIG. 7, the apparatus includes:

an obtaining module 72, configured to obtain a currently ongoing service on a terminal;

a releasing module 74, configured to release the currently ongoing service on the terminal in a case that a target service is not present in the currently ongoing service on the terminal; and an execution module 76, configured to perform network transferring of the terminal after the currently ongoing service on the terminal is released.

Optionally, the apparatus according to this embodiment of this application may further include:

a first receiving module, configured to receive first information corresponding to extended steering of roaming EXT-SOR and sent by a network-side device; and a first determining module, configured to determine, based on the first information, whether the target service is present in the currently ongoing service on the terminal, where the first information is used to indicate that a service with target information is the target service.

The first receiving module may further include a first sending unit, configured to send a notification message to the network-side device, where the notification message is used to notify the network-side device that the terminal supports an EXT-SOR capability; and a receiving unit, configured to receive the first information corresponding to EXT-SOR and sent by the network-side device.

Optionally, the notification message includes at least one of the following: a registration request message, an uplink non-transport-layer transport message, and a protocol data unit session message.

Optionally, the first determining module in this embodiment of this application includes one of the following: a first judgment unit, configured to determine, based on the first information, whether the target service is present in the currently ongoing service on the terminal; and a second judgment unit, configured to determine, based on the first information, and/or subscription information stored in the terminal, and/or a target service agreed between the terminal and the network-side device, and/or a target service defined by the terminal, whether the target service is present in the currently ongoing service on the terminal.

Optionally, the releasing module 74 in this embodiment of this application may further include: a first releasing unit, configured to immediately release the currently ongoing service on the terminal based on an indication of the first information; or a second releasing unit, configured to release the currently ongoing service on the terminal after a preset time period based on an indication of the first information.

Optionally, the second releasing unit is further configured to start a timer based on the indication of the first information, and in a case that the timer expires, release the currently ongoing service on the terminal.

Optionally, the apparatus in this embodiment of this application may further include a second determining module, configured to autonomously determine whether the target service is present in the currently ongoing service on the terminal.

The second determining module is further configured to autonomously determine, based on subscription information stored in the terminal, and/or a target service agreed between the terminal and the network-side device, and/or a target service defined by the terminal, whether the target service is present in the currently ongoing service on the terminal.

Optionally, the releasing module in this embodiment of this application may further include: a third releasing unit, configured to determine to immediately release the currently ongoing service on the terminal; or a fourth releasing unit, configured to determine to release the currently ongoing service on the terminal after a preset time period that is defined.

The fourth releasing unit is further configured to determine to start a timer and, in a case that the timer expires, release the currently ongoing service on the terminal.

Optionally, the apparatus in this embodiment of this application may further include: a second receiving module, configured to, before the timer expires, receive second information corresponding to EXT-SOR and sent by the network-side device, where the second information is information updated from the first information; and a first processing module, configured to stop the timer and overwrite the first information with the second information, and determine, based on the second information, whether the target service is present in the currently ongoing service on the terminal; or discard the second information and, in a case that the timer expires, release the currently ongoing service on the terminal based on the first information.

Optionally, the apparatus in this embodiment of this application may further include: a third determining module, configured to: in a case that the target service is present in the currently ongoing service on the terminal, determine whether the target service has ended; and a fourth determining module, configured to: in a case that the target service has ended, determine that the target is not present in the currently ongoing service on the terminal.

Optionally, the apparatus in this embodiment of this application may further include: a fifth determining module, configured to determine whether a visited public land mobile network VPLMN in the network-side device has changed; and a second processing module, configured to: in a case that the VPLMN has changed, delete the first information, or determine, based on the first information, whether the target service is present in the currently ongoing service on the terminal.

Optionally, the apparatus in this embodiment of this application may further include: a detection module, configured to, after the first information sent by the network-side device is received, perform security detection on the first information, where the security detection includes integrity check and/or decryption detection; a sixth determining module, configured to determine, in a case that the security detection on the first information succeeds, whether a VPLMN in the network-side device has changed; and a first sending module, configured to send feedback information to the network-side device in a case that the VPLMN in the network-side device does not change, where the feedback information is used to indicate that the terminal has received the first information.

The first sending module may further include: a protection unit, configured to apply protection on the feedback information, where the protection includes integrity protection and/or encryption protection; and a second sending unit, configured to send the feedback information obtained through protection to the network-side device by using a registration termination message or an uplink non-access stratum transport message.

Optionally, the apparatus in this embodiment of this application may further include: a storing module, configured to, after the first information is received, store the first information in a universal subscriber identity module USIM or mobile equipment ME.

Optionally, the apparatus in this embodiment of this application may further include: an exchange module, configured to exchange the first information with a user via an AT interface.

Optionally, the target information in this embodiment of this application includes at least one of the following: type of the target service, name of the target service, number of the target service, target S-NSSAI, target DNN, target 5QI, request type of a target PDU session, target IP address, and target group filter.

Optionally, the first receiving module in this embodiment of this application receives the first information sent by the network-side device and carried in at least one of the following: an SOR transparent container and an EXT-SOR transparent container.

Optionally, the EXT-SOR transparent container includes at least one of the following: EXT-SOR information 1, EXT-SOR information 2, and EXT-SOR security information.

Optionally, a 5GMM capability in the notification message is used to indicate to the network-side device that the terminal supports the EXT-SOR capability.

Optionally, SOR header-new or EXT-SOR header-new in the feedback information is used to indicate that the terminal receives the first information.

Optionally, the target service is a service whose service priority is higher than a preset priority.

Figure 8:
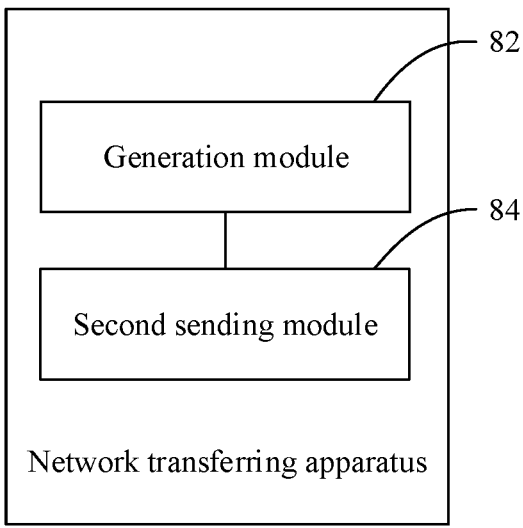
FIG. 8 is a second schematic structural diagram of a network transferring apparatus according to an embodiment of this application.

The foregoing describes this application from a terminal side. The following describes this application from a network side. An embodiment of this application further provides a network transferring apparatus. FIG. 8 is a second schematic structural diagram of a network transferring apparatus according to this embodiment of this application. As shown in FIG. 8, the apparatus includes:

a generation module 82, configured to generate first information corresponding to EXT-SOR; and a second sending module 84, configured to send the first information to a terminal, where the first information indicates that a service with target information is a target service.

Optionally, the target information includes at least one of the following:

type of the target service, name of the target service, number of the target service, target network slice selection assistance information S-NSSAI, target data network name DNN, target 5QI, request type of a target protocol data unit PDU session, target Internet protocol IP address, and target group filter.

Optionally, the generation module 82 in this embodiment of this application may further include: an HPLMN UDM network element, configured to generate the first information.

Optionally, the second sending module 84 in this embodiment of this application may further include: an HPLMN UDM network element, configured to send the first information to an AMF network element; and the AMF network element, configured to transparently transfer the first information to the terminal.

Optionally, the AMF network element transparently transmits the first information to the terminal via at least one of the following: an SOR transparent container and an EXT-SOR transparent container.

Optionally, the EXT-SOR transparent container includes at least one of the following: EXT-SOR information 1, EXT-SOR information 2, and EXT-SOR security information.

Optionally, the apparatus in this embodiment of this application may further include: an HPLMN UDM network element, configured to, before the HPLMN UDM network element sends the first information to the AMF network element, request an AUSF network element to apply protection on the first information.

Optionally, the apparatus in this embodiment of this application may further include: the second sending module, further configured to, after the network-side device sends the first information to the terminal, send second information corresponding to EXT-SOR to the terminal; and/or a third receiving module, configured to receive feedback information obtained through protection and sent by the terminal, and perform de-protection on the feedback information, where the feedback information is used to indicate that the terminal has received the first information.

In this embodiment of this application, the terminal can release the currently ongoing service on the terminal in a case that the target service is not present in the currently ongoing service on the terminal, so as to implement network transferring. If the target service is a high-priority service, the terminal may release the currently ongoing service on the terminal and perform network transferring in a case that the high-priority service is not present in the currently ongoing service on the terminal. In addition, the target service may be one or more services specified by the terminal. That is, the terminal may release the currently ongoing service on the terminal and perform network transferring in a case that the specified one or more services are not present in the currently ongoing service on the terminal. This resolves the prior-art problem that a terminal remains camping on a current network and cannot implement network transferring in a case that there is an unimportant service currently on the terminal.

The network transferring apparatus in this embodiment of this application may be an apparatus, or may be a component, an integrated circuit, or a chip in the terminal. The apparatus may be a mobile terminal or a non-mobile terminal. For example, the mobile terminal may include but is not limited to the types of the terminal 11 listed above, and the non-mobile terminal may be a server, a network attached storage (NAS), a personal computer (PC), a television (TV), a teller machine, a self-service machine, or the like, which is not specifically limited in this embodiment of this application.

The network transferring apparatus in this embodiment of this application may be an apparatus having an operating system. The operating system may be an Android operating system, an iOS operating system, or other possible operating systems, and is not specifically limited in the embodiments of this application.

The network transferring apparatus provided in this embodiment of this application can implement the processes implemented in the method embodiment in FIG. 2 or FIG. 5, with the same technical effects achieved. To avoid repetition, details are not described herein again.

Figure 9:
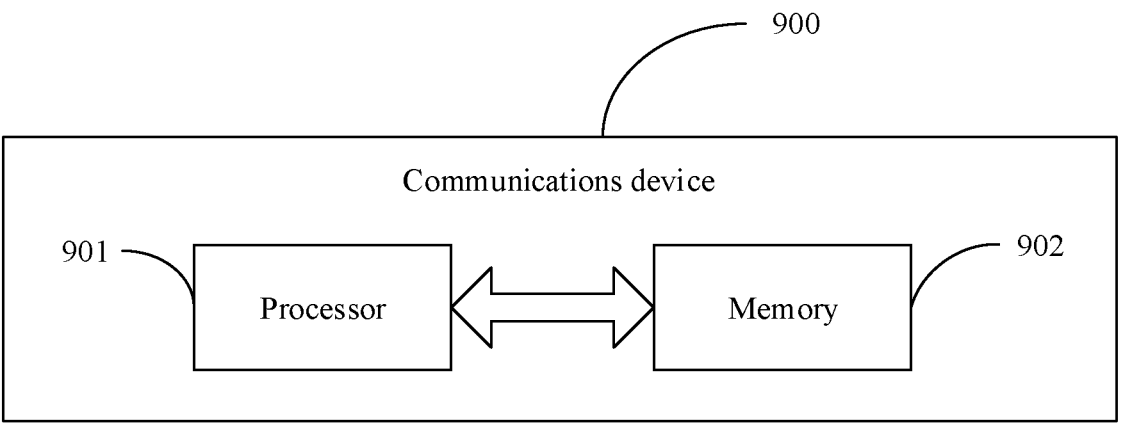
FIG. 9 is a schematic structural diagram of a communications device according to an embodiment of this application.

Optionally, as shown in FIG. 9, an embodiment of this application further provides a communications device 900, including a processor 901, a memory 902, and a program or instructions stored in the memory 902 and capable of running on the processor 901. For example, when the communications device 900 is a terminal and when the program or the instructions are executed by the processor 901, the processes of the foregoing embodiment of the network transferring method are implemented, with the same technical effects achieved. When the communications device 900 is a network-side device and when the program or the instructions are executed by the processor 901, the processes of the foregoing embodiment of the network transferring method are implemented, with the same technical effects achieved. To avoid repetition, details are not described herein again.

Figure 10:
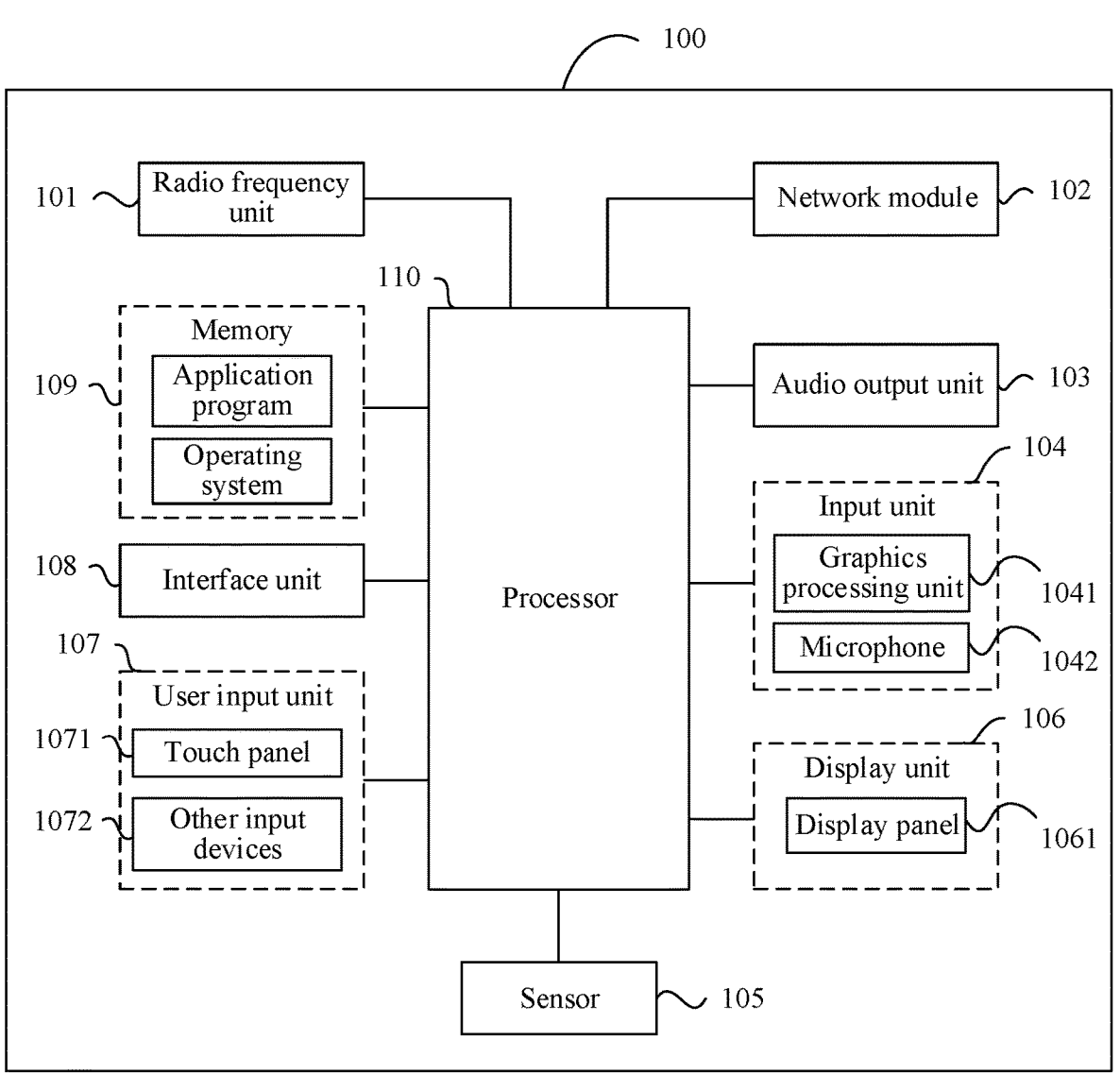
FIG. 10 is a schematic diagram of a hardware structure of a terminal for implementing the embodiments of this application.

FIG. 10 is a schematic diagram of a hardware structure of a terminal for implementing the embodiments of this application.

The terminal 100 includes but is not limited to components such as a radio frequency unit 101, a network module 102, an audio output unit 103, an input unit 104, a sensor 105, a display unit 106, a user input unit 107, an interface unit 108, a memory 109, and a processor 110.

Persons skilled in the art can understand that the terminal 100 may further include a power supply (for example, a battery) supplying power to the components, and the power supply may be logically connected to the processor 110 through a power management system. In this way, functions such as charge management, discharge management, and power consumption management are implemented by using the power management system. The structure of the terminal shown in FIG. 10 does not constitute any limitation on the terminal. The terminal may include more or fewer components than shown in FIG. 10, or a combination of some components, or the components disposed differently. Details are not described herein again.

It can be understood that in this embodiment of this application, the input unit 104 may include a graphics processing unit (GPU) 1041 and a microphone 1042. The graphics processing unit 1041 processes image data of a still picture or video obtained by an image capture apparatus (such as a camera) in a video capture mode or an image capture mode. The display unit 106 may include a display panel 1061, and the display panel 1061 may be configured in a form of a liquid crystal display, an organic light-emitting diode, and the like. The user input unit 107 may include a touch panel 1071 and other input devices 1072. The touch panel 1071 is also referred to as a touchscreen. The touch panel 1071 may include two parts: a touch detection apparatus and a touch controller. The other input devices 1072 may include but are not limited to a physical keyboard, a function key (such as a volume control key or a power on/off key), a trackball, a mouse, a joystick, and the like. Details are not described herein.

In this embodiment of this application, the radio frequency unit 101 receives downlink data from a network-side device, and then sends the downlink data to the processor 110 for processing; and also sends uplink data to the network-side device. Generally, the radio frequency unit 101 includes but is not limited to an antenna, at least one amplifier, a transceiver, a coupler, a low noise amplifier, a duplexer, and the like.

The memory 109 may be configured to store software programs or instructions and various data. The memory 109 may include a program or instruction storage area and a data storage area. The program or instruction storage area may store an operating system, an application program or instructions required by at least one function (for example, a sound playback function or an image playback function), and the like. In addition, the memory 109 may include a high-speed random access memory, and may further include a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory, for example, at least one disk storage device, a flash memory device, or another volatile solid-state storage device.

The processor 110 may include one or more processing units. Optionally, an application processor and a modem processor may be integrated in the processor 110. The application processor primarily processes an operating system, user interfaces, application programs or instructions, and the like. The modem processor primarily processes radio communication, for example, being a baseband processor. It can be understood that the modem processor may alternatively not be integrated in the processor 110.

Figure 11:
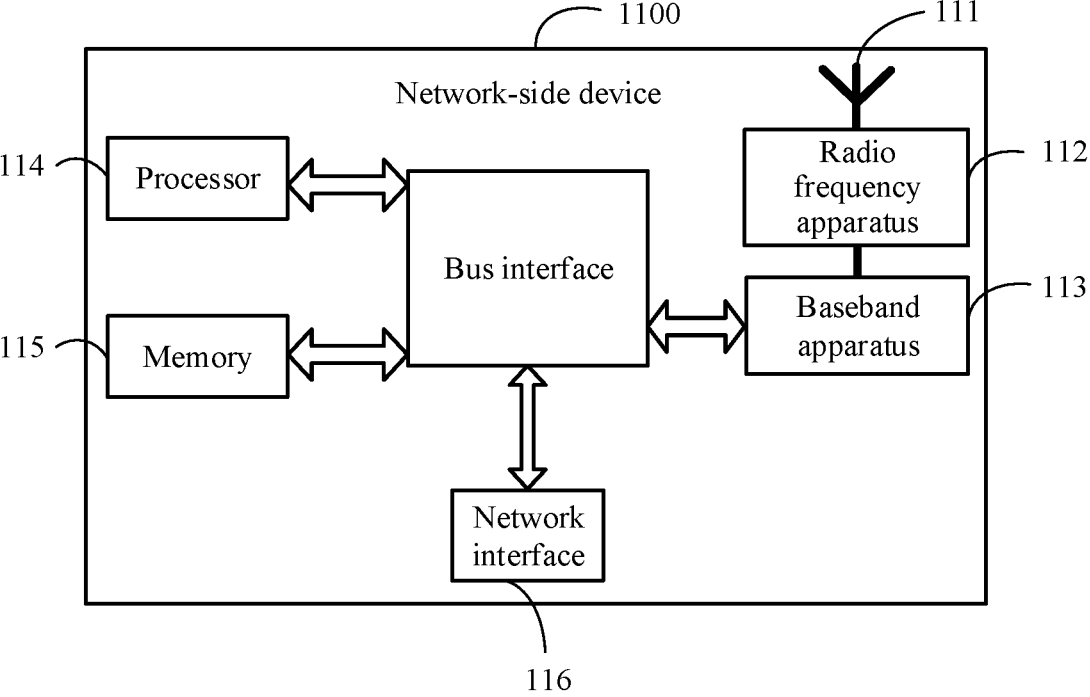
FIG. 11 is a schematic structural diagram of a network-side device according to an embodiment of this application.

Specifically, an embodiment of this application further provides a network-side device. As shown in FIG. 11, the network device 1100 includes an antenna 111, a radio frequency apparatus 112, and a baseband apparatus 113. The antenna 111 is connected to the radio frequency apparatus 112. In an uplink direction, the radio frequency apparatus 112 receives information by using the antenna 111, and sends the received information to the baseband apparatus 113 for processing. In a downlink direction, the baseband apparatus 113 processes to-be-sent information, and sends the information to the radio frequency apparatus 112; and the radio frequency apparatus 112 processes the received information and then sends the information out by using the antenna 111.

The frequency band processing apparatus may be located in the baseband apparatus 113. The method performed by the network-side device in the foregoing embodiments may be implemented in the baseband apparatus 113, and the baseband apparatus 113 includes a processor 114 and a memory 115.

The baseband apparatus 113 may include, for example, at least one baseband processing unit, where a plurality of chips are disposed on the baseband processing unit. As shown in FIG. 11, one of the chips is, for example, the processor 114, connected to the memory 115, to invoke a program in the memory 115 to perform the operation of the network device shown in the foregoing method embodiment.

The baseband apparatus 113 may further include a network interface 116, configured to exchange information with the radio frequency apparatus 112, where the interface is, for example, a common public radio interface (CPRI).

Specifically, the network-side device in this embodiment of the present application further includes: instructions or a program stored in the memory 115 and capable of running on the processor 114. The processor 114 invokes the instructions or program in the memory 115 to execute the method executed by the modules shown in FIG. 8, with the same technical effects achieved. To avoid repetition, details are not described herein again.

An embodiment of this application further provides a readable storage medium, where a program or instructions are stored in the readable storage medium. When the program or instructions are executed by a processor, the processes of the foregoing network transferring method embodiment can be implemented, with same technical effects achieved. To avoid repetition, details are not described herein again.

The processor is a processor in the terminal described in the foregoing embodiment. The readable storage medium includes a computer-readable storage medium, for example, a computer read-only memory (ROM), a random access memory (RAM), a magnetic disk, or an optical disc.

An embodiment of this application further provides a chip, where the chip includes a processor and a communications interface. The communications interface is coupled to the processor, and the processor is configured to run a program or instructions of a network-side device to implement the processes of the foregoing network transferring method embodiments, with the same technical effects achieved. To avoid repetition, details are not described herein again.

It should be understood that the chip mentioned in this embodiment of this application may also be referred to as a system-on-chip, a system chip, a system-on-a-chip, or a system on a chip, or the like.

An embodiment of this application further provides a program product, where the program product is stored in a non-volatile storage medium, and the program product is executed by at least one processor to implement the processes of the foregoing network transferring method embodiments, with the same technical effects achieved. To avoid repetition, details are not repeated herein.

It should be noted that in this specification, the term "include", "comprise", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . ." does not preclude existence of other identical elements in the process, method, article, or apparatus that includes the element. Furthermore, it should be noted that, in the scope of the method and apparatus in the embodiments of this application, execution of the functions is not limited to the order shown or described, and the functions may alternatively be executed in a substantially simultaneous manner or in a reverse order. For example, the described method may be performed in an order different from that described, and steps may be added, omitted, or combined. In addition, features described with reference to some examples may be combined in other examples.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of this application essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A network transferring method, comprising:
obtaining, by a terminal, a currently ongoing service on the terminal;
receiving, by the terminal, first information corresponding to extended steering of roaming (EXT-SOR) which is sent by a network-side device;
determining, by the terminal based on the first information, whether a target service is present in the currently ongoing service on the terminal, wherein the first information is used to indicate that a service with target information is the target service;
releasing, by the terminal, the currently ongoing service on the terminal in accordance with a determination that the target service is not present in the currently ongoing service on the terminal; and
performing, by the terminal, network transferring from a current network to a selected network after releasing the currently ongoing service on the terminal;
wherein the target information comprises at least one of the following:
target single network slice selection assistance information (S-NSSAI), target 5G quality of service identifier (5QI), request type of a target protocol data unit (PDU) session, target Internet protocol (IP) address, or target group filter.

2. The method according to claim 1, wherein the receiving first information corresponding to extended steering of roaming (EXT-SOR) and sent by the network-side device comprises:
sending, by the terminal, a notification message to the network-side device, wherein the notification message is used to notify the network-side device that the terminal supports an EXT-SOR capability; and receiving, by the terminal, the first information corresponding to EXT-SOR and sent by the network-side device;
and/or
wherein the releasing, by the terminal, the currently ongoing service on the terminal comprises:
immediately releasing, by the terminal, the currently ongoing service on the terminal based on an indication of the first information; or
releasing, by the terminal, the currently ongoing service on the terminal after a preset time period based on an indication of the first information.

3. The method according to claim 2, wherein the determining, based on the first information, whether the target service is present in the currently ongoing service on the terminal comprises one of the following:
determining, by the terminal based on the first information, whether the target service is present in the currently ongoing service on the terminal; or
determining, by the terminal based on the first information, and/or subscription information stored in the terminal, and/or a target service agreed between the terminal and the network-side device, and/or a target service defined by the terminal, whether the target service is present in the currently ongoing service on the terminal.

4. The method according to claim 2, wherein the releasing, by the terminal, the currently ongoing service on the terminal after a preset time period based on an indication of the first information comprises:
starting, by the terminal, a timer based on the indication of the first information, and in a case that the timer expires, releasing the currently ongoing service on the terminal.

5. The method according to claim 4, further comprising:
determining, by the terminal, whether a visited public land mobile network (VPLMN) in the network-side device has changed; and
determining, by the terminal in a case that the VPLMN has changed, that the first information is invalid and stopping the timer, or determining, based on the first information, whether the target service is present in the currently ongoing service on the terminal.

6. The method according to claim 1, wherein after the receiving first information sent by the network-side device, the method further comprises:
performing, by the terminal, security detection on the first information, wherein the security detection comprises integrity check and/or decryption detection;
determining, by the terminal in a case that the security detection on the first information succeeds, whether a VPLMN in the network-side device has changed; and
sending, by the terminal, feedback information to the network-side device in a case that the VPLMN in the network-side device does not change, wherein the feedback information is used to indicate that the terminal has received the first information.

7. The method according to claim 6, wherein the sending feedback information to the network-side device comprises:
applying, by the terminal, protection on the feedback information, wherein the protection comprises integrity protection and/or encryption protection; and
sending, by the terminal, the feedback information obtained through protection to the network-side device by using a registration termination message or an uplink non-access stratum transport message.

8. The method according to claim 1, wherein the target information further comprises at least one of the following: type of the target service, name of the target service, number of the target service, or target data network name (DNN).

9. The method according to claim 1, wherein the terminal receives the first information sent by the network-side device and carried in at least one of the following: an SOR transparent container or an EXT-SOR transparent container.

10. The method according to claim 9, wherein the EXT-SOR transparent container comprises at least one of the following: EXT-SOR information 1, EXT-SOR information 2, or EXT-SOR security information, wherein the EXT-SOR security information comprises: a value of a counter required for generating to-be-protected first information, and/or a checksum for generating to-be-protected first information, and/or encrypted ciphertext information for generating to-be-protected first information.

11. The method according to claim 1, wherein the target service is a service whose service priority is higher than a preset priority.

12. A network transferring method, comprising:
generating, by a network-side device, first information corresponding to extended steering of roaming (EXT-SOR), wherein the first information indicates that a service with target information is a target service; and wherein the target information comprises at least one of the following: target single network slice selection assistance information (S-NSSAI), target 5G quality of service identifier (5QI), request type of a target protocol data unit (PDU) session, target Internet protocol (IP) address, or target group filter; and
sending, by the network-side device, the first information to a terminal, to cause the terminal to determine based on the first information, whether the target service is present in a currently ongoing service on the terminal, to release the currently ongoing service on the terminal in accordance with a determination that the target service is not present in the currently ongoing service on the terminal, and to perform network transferring from a current network to a selected network after releasing the currently ongoing service on the terminal.

13. The method according to claim 12, wherein the target information further comprises at least one of the following: type of the target service, name of the target service, number of the target service, or target data network name (DNN).

14. The method according to claim 12, wherein the generating, by the network-side device, first information comprises:
generating, by a home public land mobile network unified data management (HPLMN UDM) network element in the network-side device, the first information;
wherein the sending, by the network-side device, the first information to a terminal comprises:
sending, by the HPLMN UDM network element in the network-side device, the first information to an access and mobility management function (AMF) network element in the network-side device; and
transparently transmitting, by the AMF network element in the network-side device, the first information to the terminal.

15. The method according to claim 14, wherein the AMF network element in the network-side device transparently transmits the first information to the terminal via at least one of the following: an SOR transparent container or an EXT-SOR transparent container;

wherein the EXT-SOR transparent container comprises at least one of the following: EXT-SOR information 1, EXT-SOR information 2, or EXT-SOR security information, wherein the EXT-SOR security information comprises: a value of a counter required for generating to-be-protected first information, and/or a checksum for generating to-be-protected first information, and/or encrypted ciphertext information for generating to-be-protected first information.

16. The method according to claim 14, wherein before the HPLMN UDM network element in the network-side device sends the first information to the AMF network element in the network-side device, the method further comprises:
requesting, by the HPLMN UDM network element in the network-side device, an authorization server function (AUSF) network element in the network-side device to apply protection on the first information;
and/or
wherein after the sending, by the network-side device, the first information to a terminal, the method further comprises:
sending, by the network-side device, second information corresponding to EXT-SOR to the terminal; and/or
receiving, by the network-side device, feedback information obtained through protection and sent by the terminal, and performing de-protection on the feedback information, wherein the feedback information is used to indicate that the terminal has received the first information.

17. A network-side device, comprising a processor, a memory, and instructions stored in the memory and capable of running on the processor, wherein when the instructions are executed by the processor, the steps of the network transferring method according to claim 12 are implemented.

18. A terminal, comprising a processor, a memory, and instructions stored in the memory and capable of running on the processor, wherein when the instructions are executed by the processor, steps of a network transferring method are implemented, the steps comprise:
obtaining, by a terminal, a currently ongoing service on the terminal;
receiving, by the terminal, first information corresponding to extended steering of roaming (EXT-SOR) which is sent by a network-side device;
determining, by the terminal based on the first information, whether a target service is present in the currently ongoing service on the terminal, wherein the first information is used to indicate that a service with target information is the target service;
releasing, by the terminal, the currently ongoing service on the terminal in accordance with a determination that the target service is not present in the currently ongoing service on the terminal; and
performing, by the terminal, network transferring from a current network to a selected network after releasing the currently ongoing service on the terminal;
wherein the target information comprises at least one of the following:
target single network slice selection assistance information (S-NSSAI), target 5G quality of service identifier (5QI), request type of a target protocol data unit (PDU) session, target Internet protocol (IP) address, or target group filter.

* * * * *